(12) United States Patent
Kano et al.

(10) Patent No.: US 7,427,162 B2
(45) Date of Patent: Sep. 23, 2008

(54) ROLLING ELEMENT

(75) Inventors: Makoto Kano, Yokohama (JP); Yutaka Mabuchi, Yokohama (JP); Takahiro Hamada, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 4 days.

(21) Appl. No.: 10/853,670

(22) Filed: May 26, 2004

(65) Prior Publication Data

US 2004/0241448 A1 Dec. 2, 2004

(30) Foreign Application Priority Data

May 27, 2003 (JP) ............................. 2003-148524
Aug. 13, 2003 (JP) ............................. 2003-207430

(51) Int. Cl.
*F16C 33/62* (2006.01)

(52) U.S. Cl. .................... 384/492; 508/291; 384/907.1

(58) Field of Classification Search ................. 384/322, 384/445, 456, 490, 492, 494, 548, 907, 912, 384/913

See application file for complete search history.

(56) References Cited

U.S. PATENT DOCUMENTS

| 1,461 | A | 12/1839 | Day |
|---|---|---|---|
| 2,716,972 | A | 9/1955 | Farny et al. |
| 2,982,733 | A | 5/1961 | Wright et al. |
| 3,211,647 | A | 10/1965 | O'Halloran et al. |
| 3,790,315 | A | 2/1974 | Emanuelsson et al. |
| 3,846,162 | A | 11/1974 | Bloom |
| 3,932,228 | A | 1/1976 | Sugiyama et al. |
| 4,031,023 | A | 6/1977 | Musser et al. |
| 4,367,130 | A | 1/1983 | Lemelson |
| 4,385,880 | A | 5/1983 | Lemelson |
| 4,538,929 | A | 9/1985 | Ehrentraut et al. |
| 4,554,208 | A | 11/1985 | MacIver et al. |
| 4,645,610 | A | 2/1987 | Born et al. |
| 4,702,808 | A | 10/1987 | Lemelson |
| 4,712,982 | A | 12/1987 | Inagaki et al. |
| 4,755,237 | A | 7/1988 | Lemelson |
| 4,755,426 | A | 7/1988 | Kokai et al. |

(Continued)

FOREIGN PATENT DOCUMENTS

CN 1407211 A 4/2003

(Continued)

OTHER PUBLICATIONS

U.S. Appl. No. 10/911,741, filed May 5, 2004, Ueno.

(Continued)

*Primary Examiner*—Thomas R. Hannon
*Assistant Examiner*—Justin Krause
(74) *Attorney, Agent, or Firm*—Foley & Lardner LLP

(57) ABSTRACT

A low friction sliding combination of a cam and a cam follower which are in slidable contact with each other in presence of a lubricating oil. The cam follower includes a cylindrical and hollow outer roller having an outer peripheral surface in slidable contact with the cam. A fixed pin is coaxially disposed inside the outer roller and rotatably movable relative to the outer roller. A diamond-like carbon material is coated on a sliding surface of at least one of the outer roller and the fixed pin. The lubricating oil contains at least one of ashless fatty acid ester friction modifier and ashless aliphatic amine friction modifier.

15 Claims, 2 Drawing Sheets

U.S. PATENT DOCUMENTS

| | | | |
|---|---|---|---|
| 4,778,522 A | 10/1988 | Maki et al. |
| 4,783,368 A | 11/1988 | Yamamoto et al. |
| 4,834,400 A | 5/1989 | Lebeck |
| 4,842,755 A | 6/1989 | Dunn |
| 4,859,493 A | 8/1989 | Lemelson |
| 4,874,596 A | 10/1989 | Lemelson |
| 4,919,974 A | 4/1990 | McCune et al. |
| 4,933,058 A | 6/1990 | Bache et al. |
| 4,943,345 A | 7/1990 | Asmussen et al. |
| 4,960,643 A | 10/1990 | Lemelson |
| 4,974,498 A | 12/1990 | Lemelson |
| 4,980,021 A | 12/1990 | Kitamura et al. |
| 4,980,610 A | 12/1990 | Varga |
| 4,981,717 A | 1/1991 | Thaler |
| 4,988,421 A | 1/1991 | Drawl et al. |
| 4,992,082 A | 2/1991 | Drawl et al. |
| 5,000,541 A | 3/1991 | DiMarcello et al. |
| 5,021,628 A | 6/1991 | Lemelson |
| 5,032,243 A | 7/1991 | Bache et al. |
| 5,036,211 A | 7/1991 | Scott |
| 5,040,501 A | 8/1991 | Lemelson |
| 5,067,826 A | 11/1991 | Lemelson |
| 5,077,990 A | 1/1992 | Plath |
| 5,078,848 A | 1/1992 | Anttila et al. |
| 5,087,608 A | 2/1992 | Chan et al. |
| 5,096,352 A | 3/1992 | Lemelson |
| 5,110,435 A | 5/1992 | Haberland |
| 5,112,025 A | 5/1992 | Nakayama et al. |
| 5,127,314 A | 7/1992 | Swain |
| 5,131,941 A | 7/1992 | Lemelson |
| 5,132,587 A | 7/1992 | Lemelson |
| 5,142,785 A | 9/1992 | Grewal et al. |
| 5,143,634 A | 9/1992 | Quinga et al. |
| 5,148,780 A | 9/1992 | Urano et al. |
| 5,187,021 A | 2/1993 | Vydra et al. |
| 5,190,807 A | 3/1993 | Kimock et al. |
| 5,190,824 A | 3/1993 | Itoh |
| 5,202,156 A | 4/1993 | Yamamoto et al. |
| 5,205,188 A | 4/1993 | Repenning et al. |
| 5,205,305 A | 4/1993 | Yamakita |
| H1210 H | 7/1993 | Jansen |
| 5,232,568 A | 8/1993 | Parent et al. |
| 5,237,967 A | 8/1993 | Willermet et al. |
| 5,249,554 A | 10/1993 | Tamor et al. |
| 5,255,783 A | 10/1993 | Goodman et al. |
| 5,255,929 A | 10/1993 | Lemelson |
| 5,284,394 A | 2/1994 | Lemelson |
| 5,288,556 A | 2/1994 | Lemelson |
| 5,295,305 A | 3/1994 | Hahn et al. |
| 5,299,937 A | 4/1994 | Gow |
| 5,317,938 A | 6/1994 | de Juan, Jr. et al. |
| 5,326,488 A | 7/1994 | Minokami et al. |
| 5,334,306 A | 8/1994 | Dautremont-Smith et al. |
| 5,349,265 A | 9/1994 | Lemelson |
| 5,358,402 A | 10/1994 | Reed et al. |
| 5,359,170 A | 10/1994 | Chen et al. |
| 5,360,227 A | 11/1994 | Lemelson |
| 5,380,196 A | 1/1995 | Kelly et al. |
| 5,401,543 A | 3/1995 | O'Neill et al. |
| H1461 H | 7/1995 | DiVita et al. |
| 5,432,539 A | 7/1995 | Anderson |
| 5,433,977 A | 7/1995 | Sarin et al. |
| 5,443,032 A | 8/1995 | Vichr et al. |
| 5,447,208 A | 9/1995 | Lund et al. |
| 5,456,406 A | 10/1995 | Lemelson |
| 5,458,754 A | 10/1995 | Sathrum et al. |
| 5,461,648 A | 10/1995 | Nauflett et al. |
| 5,462,772 A | 10/1995 | Lemelson |
| 5,464,667 A | 11/1995 | Köhler et al. |
| 5,466,431 A | 11/1995 | Dorfman et al. |
| 5,482,602 A | 1/1996 | Cooper et al. |
| 5,491,028 A | 2/1996 | Sarin et al. |
| 5,497,550 A | 3/1996 | Trotta et al. |
| 5,509,841 A | 4/1996 | Winsor |
| 5,516,729 A | 5/1996 | Dawson et al. |
| 5,529,815 A | 6/1996 | Lemelson |
| 5,531,878 A | 7/1996 | Vadgama et al. |
| 5,541,566 A | 7/1996 | Deeney |
| 5,547,716 A | 8/1996 | Thaler |
| 5,551,959 A | 9/1996 | Martin et al. |
| 5,552,675 A | 9/1996 | Lemelson |
| 5,568,391 A | 10/1996 | Mckee |
| 5,593,719 A | 1/1997 | Dearnaley et al. |
| 5,616,372 A | 4/1997 | Conley et al. |
| 5,619,889 A | 4/1997 | Jones et al. |
| 5,628,881 A | 5/1997 | Lemelson |
| 5,630,275 A | 5/1997 | Wexler |
| 5,630,953 A | 5/1997 | Klink |
| 5,653,300 A | 8/1997 | Lund et al. |
| 5,669,144 A | 9/1997 | Hahn et al. |
| 5,672,054 A | 9/1997 | Cooper et al. |
| 5,688,557 A | 11/1997 | Lemelson et al. |
| 5,707,409 A | 1/1998 | Martin et al. |
| 5,714,202 A | 2/1998 | Lemelson et al. |
| 5,719,109 A | 2/1998 | Tokashiki et al. |
| 5,723,207 A | 3/1998 | Lettington et al. |
| 5,731,046 A | 3/1998 | Mistry et al. |
| 5,735,769 A | 4/1998 | Takemura et al. |
| 5,740,941 A | 4/1998 | Lemelson |
| 5,775,817 A | 7/1998 | Gottemoller et al. |
| 5,786,038 A | 7/1998 | Conley et al. |
| 5,790,146 A | 8/1998 | Anderson |
| 5,793,390 A | 8/1998 | Claflin et al. |
| 5,794,801 A | 8/1998 | Lemelson |
| 5,799,549 A | 9/1998 | Decker et al. |
| 5,806,557 A | 9/1998 | Helge |
| 5,824,387 A | 10/1998 | Boutaghou et al. |
| 5,834,708 A | 11/1998 | Svetal et al. |
| 5,840,662 A | 11/1998 | Nibert et al. |
| 5,843,571 A | 12/1998 | Sho |
| 5,851,962 A | 12/1998 | Kaga |
| 5,866,195 A | 2/1999 | Lemelson |
| 5,871,805 A | 2/1999 | Lemelson |
| 5,881,444 A | 3/1999 | Schaefer et al. |
| 5,901,021 A | 5/1999 | Hirano et al. |
| 5,910,940 A | 6/1999 | Guerra |
| 5,927,897 A | 7/1999 | Attar |
| 5,937,812 A | 8/1999 | Reedy et al. |
| 5,940,975 A | 8/1999 | Decker et al. |
| 5,945,214 A | 8/1999 | Ma et al. |
| 5,947,710 A | 9/1999 | Cooper et al. |
| 5,952,102 A | 9/1999 | Cutler |
| 5,958,261 A | 9/1999 | Offer et al. |
| 5,960,762 A | 10/1999 | Imai |
| 5,967,250 A | 10/1999 | Lund et al. |
| 5,968,596 A | 10/1999 | Ma et al. |
| 5,975,686 A | 11/1999 | Hauck et al. |
| 5,976,707 A | 11/1999 | Grab |
| 5,992,268 A | 11/1999 | Decker et al. |
| 5,993,938 A | 11/1999 | Tsukuda et al. |
| 6,006,415 A | 12/1999 | Schaefer et al. |
| 6,015,597 A | 1/2000 | David |
| 6,016,000 A | 1/2000 | Moslehi |
| 6,023,979 A | 2/2000 | Bills et al. |
| 6,028,393 A | 2/2000 | Izu et al. |
| 6,051,298 A | 4/2000 | Ko et al. |
| 6,056,443 A | 5/2000 | Koike et al. |
| 6,059,460 A | 5/2000 | Ono et al. |
| 6,059,830 A | 5/2000 | Lippincott, III et al. |
| 6,071,597 A | 6/2000 | Yang et al. |
| 6,083,313 A | 7/2000 | Venkatraman et al. |
| 6,083,570 A | 7/2000 | Lemelson et al. |
| 6,095,690 A | 8/2000 | Niegel et al. |
| 6,099,541 A | 8/2000 | Klopotek |

| | | | | | | |
|---|---|---|---|---|---|---|
| 6,099,976 | A | 8/2000 | Lemelson et al. | 6,585,064 B2 | 7/2003 | Griffin et al. |
| 6,106,919 | A | 8/2000 | Lee et al. | 6,586,069 B2 | 7/2003 | Dykes et al. |
| 6,124,198 | A | 9/2000 | Moslehi | 6,589,640 B2 | 7/2003 | Griffin et al. |
| 6,142,481 | A | 11/2000 | Iwashita et al. | 6,592,519 B1 | 7/2003 | Martinez |
| 6,145,608 | A | 11/2000 | Lund et al. | 6,592,985 B2 | 7/2003 | Griffin et al. |
| 6,156,439 | A | 12/2000 | Coffinberry | 6,601,662 B2 | 8/2003 | Matthias et al. |
| 6,159,558 | A | 12/2000 | Wolfe et al. | 6,626,949 B1 | 9/2003 | Townley |
| 6,160,683 | A | 12/2000 | Boutaghou | 6,629,906 B1 | 10/2003 | Chiba et al. |
| 6,165,616 | A | 12/2000 | Lemelson et al. | 6,637,528 B2 | 10/2003 | Nishiyama et al. |
| 6,170,156 | B1 | 1/2001 | Lev et al. | 6,638,569 B2 | 10/2003 | McLaughlin et al. |
| 6,171,343 | B1 | 1/2001 | Dearnaley et al. | 6,645,354 B1 | 11/2003 | Gorokhovsky |
| 6,173,913 | B1 | 1/2001 | Shafer et al. | 6,656,329 B1 | 12/2003 | Ma et al. |
| 6,190,514 | B1 | 2/2001 | Ma et al. | 6,658,941 B1 | 12/2003 | Bills et al. |
| 6,193,906 | B1 | 2/2001 | Kaneko et al. | 6,666,328 B2 | 12/2003 | Sykora |
| 6,197,120 | B1 | 3/2001 | David | 6,666,671 B1 | 12/2003 | Olver et al. |
| 6,197,428 | B1 | 3/2001 | Rogers | 6,684,513 B1 | 2/2004 | Clipstone et al. |
| 6,203,651 | B1 | 3/2001 | Järvenkylä et al. | 6,684,759 B1 | 2/2004 | Gorokhovsky |
| 6,205,291 | B1 | 3/2001 | Hughes et al. | 6,695,865 B2 | 2/2004 | Boyle et al. |
| 6,207,625 | B1 | 3/2001 | Ogano et al. | 6,699,106 B2 | 3/2004 | Myoung et al. |
| 6,227,056 | B1 | 5/2001 | Bills et al. | 6,701,627 B2 | 3/2004 | Korb et al. |
| 6,237,441 | B1 | 5/2001 | Nishioka et al. | 6,715,693 B1 | 4/2004 | Dam et al. |
| 6,237,852 | B1 | 5/2001 | Svetal et al. | 6,726,993 B2 | 4/2004 | Teer et al. |
| 6,238,839 | B1 | 5/2001 | Tomita et al. | 6,729,350 B2 | 5/2004 | Schick |
| 6,255,262 | B1 | 7/2001 | Keenan et al. | 6,729,527 B2 | 5/2004 | Sonnenreich et al. |
| 6,261,424 | B1 | 7/2001 | Goncharenko et al. | 6,733,513 B2 | 5/2004 | Boyle et al. |
| 6,273,793 | B1 | 8/2001 | Liners et al. | 6,739,214 B2 | 5/2004 | Griffin et al. |
| 6,274,220 | B1 | 8/2001 | Tsukuda et al. | 6,739,238 B2 | 5/2004 | Ushijima et al. |
| 6,289,593 | B1 | 9/2001 | Decker et al. | 6,740,393 B1 | 5/2004 | Massler et al. |
| 6,293,648 | B1 | 9/2001 | Anderson | 6,745,742 B2 | 6/2004 | Meyer |
| 6,296,552 | B1 | 10/2001 | Boutaghou et al. | 6,749,033 B2 | 6/2004 | Griffin et al. |
| 6,299,425 | B1 | 10/2001 | Hirano et al. | 6,753,042 B1 | 6/2004 | Bakounine et al. |
| 6,305,416 | B1 | 10/2001 | Snel et al. | 6,753,635 B2 | 6/2004 | Kuhlmann-Wilsdorf |
| 6,309,283 | B1 | 10/2001 | Liners et al. | 6,761,532 B2 | 7/2004 | Capone et al. |
| 6,311,524 | B1 | 11/2001 | Brennan, III et al. | 6,761,736 B1 | 7/2004 | Woo et al. |
| 6,316,734 | B1 | 11/2001 | Yang | 6,780,177 B2 | 8/2004 | Shafirstein et al. |
| 6,322,431 | B1 | 11/2001 | Schaenzer et al. | 6,797,326 B2 | 9/2004 | Griffin et al. |
| 6,322,719 | B2 | 11/2001 | Kaneko et al. | 6,799,468 B2 | 10/2004 | Borenstein |
| 6,324,060 | B1 | 11/2001 | Hsu | 6,806,242 B2 | 10/2004 | Shirahama et al. |
| 6,325,385 | B1 | 12/2001 | Iwashita et al. | 6,818,029 B2 | 11/2004 | Myoung et al. |
| 6,329,328 | B1 | 12/2001 | Koganei et al. | 6,820,676 B2 | 11/2004 | Palmaz et al. |
| 6,333,298 | B1 | 12/2001 | Waddoups et al. | 6,821,189 B1 | 11/2004 | Coad et al. |
| 6,338,881 | B1 | 1/2002 | Sellschopp et al. | 6,821,624 B2 | 11/2004 | Utsumi et al. |
| 6,340,245 | B1 | 1/2002 | Horton et al. | 6,822,788 B2 | 11/2004 | Blitstein |
| 6,358,123 | B1 | 3/2002 | Liners et al. | 6,845,686 B2 | 1/2005 | Tsuchiyama et al. |
| 6,367,705 | B1 | 4/2002 | Lee et al. | 6,849,085 B2 | 2/2005 | Marton |
| 6,368,676 | B1 | 4/2002 | Gaudreau et al. | 6,855,237 B2 | 2/2005 | Kolpakov et al. |
| 6,377,422 | B1 | 4/2002 | Boutaghou et al. | 6,855,791 B2 | 2/2005 | Van Doren et al. |
| 6,379,383 | B1 | 4/2002 | Palmaz et al. | 6,861,098 B2 | 3/2005 | Griffin et al. |
| 6,385,987 | B2 | 5/2002 | Schlom et al. | 6,861,137 B2 | 3/2005 | Griffin et al. |
| 6,386,468 | B1 | 5/2002 | Neuberger et al. | 6,865,952 B2 | 3/2005 | Bills et al. |
| 6,399,215 | B1 | 6/2002 | Zhu et al. | 6,866,894 B2 | 3/2005 | Trankiem et al. |
| 6,401,058 | B1 | 6/2002 | Akalin et al. | 6,871,700 B2 | 3/2005 | Gorokhovsky |
| 6,439,845 | B1 | 8/2002 | Veres | 6,872,203 B2 | 3/2005 | Shafirstein et al. |
| 6,439,986 | B1 | 8/2002 | Myoung et al. | 6,878,447 B2 | 4/2005 | Griffin et al. |
| 6,452,752 | B1 | 9/2002 | Boutaghou | 6,880,469 B2 | 4/2005 | Frost |
| 6,468,642 | B1 | 10/2002 | Bray et al. | 6,882,094 B2 | 4/2005 | Dimitrijevic et al. |
| 6,471,979 | B2 | 10/2002 | New et al. | 6,883,476 B1 | 4/2005 | Nohara et al. |
| 6,494,881 | B1 | 12/2002 | Bales et al. | 6,886,521 B2 | 5/2005 | Hamada et al. |
| 6,523,456 | B1 | 2/2003 | Kobayashi et al. | 6,887,585 B2 | 5/2005 | Herbst-Dederichs |
| 6,524,212 | B2 | 2/2003 | Ushijima et al. | 6,890,700 B2 | 5/2005 | Tomita et al. |
| 6,534,141 | B1 | 3/2003 | Hull, Jr. et al. | 6,893,720 B1 | 5/2005 | Nakahigashi et al. |
| 6,537,310 | B1 | 3/2003 | Palmaz et al. | 6,969,198 B2 * | 11/2005 | Konishi et al. ................ 384/13 |
| 6,537,429 | B2 | 3/2003 | O'Donnell et al. | 2001/0036800 A1 | 11/2001 | Liners et al. |
| 6,543,394 | B2 | 4/2003 | Tinney | 2002/0026899 A1 | 3/2002 | McLaughlin et al. |
| 6,544,308 | B2 | 4/2003 | Griffin et al. | 2002/0031987 A1 | 3/2002 | Liners et al. |
| 6,553,957 | B1 | 4/2003 | Ishikawa et al. | 2002/0034631 A1 | 3/2002 | Griffin et al. |
| 6,557,968 | B2 | 5/2003 | Lee et al. | 2002/0034632 A1 | 3/2002 | Griffin et al. |
| 6,562,445 | B2 | 5/2003 | Iwamura | 2002/0051286 A1 | 5/2002 | Blitstein |
| 6,562,462 | B2 | 5/2003 | Griffin et al. | 2002/0070357 A1 | 6/2002 | Kim et al. |
| 6,570,172 | B2 | 5/2003 | Kim et al. | 2002/0074168 A1 | 6/2002 | Matthias et al. |
| 6,572,651 | B1 | 6/2003 | DeScheerder et al. | 2002/0089571 A1 | 7/2002 | Lee et al. |
| 6,572,935 | B1 | 6/2003 | He et al. | 2002/0090155 A1 | 7/2002 | Ushijima et al. |
| 6,572,937 | B2 | 6/2003 | Hakovirta et al. | 2002/0090578 A1 | 7/2002 | Schaefera et al. |

| | | |
|---|---|---|
| 2002/0130219 A1 | 9/2002 | Parseghian et al. |
| 2002/0148430 A1 | 10/2002 | Kano et al. |
| 2002/0155015 A1 | 10/2002 | Esumi et al. |
| 2002/0175476 A1 | 11/2002 | Chinou et al. |
| 2003/0012234 A1 | 1/2003 | Watson et al. |
| 2003/0019111 A1 | 1/2003 | Korb et al. |
| 2003/0019332 A1 | 1/2003 | Korb et al. |
| 2003/0021995 A1 | 1/2003 | Griffin et al. |
| 2003/0034182 A1 | 2/2003 | Griffin et al. |
| 2003/0035958 A1 | 2/2003 | Griffin et al. |
| 2003/0036341 A1 | 2/2003 | Myoung et al. |
| 2003/0037640 A1 | 2/2003 | Griffin et al. |
| 2003/0069632 A1 | 4/2003 | De Scheerder et al. |
| 2003/0108777 A1 | 6/2003 | Gunsel et al. |
| 2003/0114094 A1 | 6/2003 | Myoung et al. |
| 2003/0128903 A1 | 7/2003 | Yasuda et al. |
| 2003/0159919 A1 | 8/2003 | Fairbairn et al. |
| 2003/0162672 A1 | 8/2003 | Shirahama et al. |
| 2003/0168323 A1 | 9/2003 | Frost |
| 2003/0180565 A1 | 9/2003 | Herbst-Dederichs |
| 2003/0199741 A1 | 10/2003 | Martinez |
| 2003/0234371 A1 | 12/2003 | Ziegler |
| 2003/0235691 A1 | 12/2003 | Griffin et al. |
| 2004/0003638 A1 | 1/2004 | Schaefer et al. |
| 2004/0008406 A1 | 1/2004 | Blitstein |
| 2004/0010068 A1 | 1/2004 | Doren et al. |
| 2004/0011900 A1 | 1/2004 | Gebhardt et al. |
| 2004/0027018 A1 | 2/2004 | LeBlanc et al. |
| 2004/0035375 A1 | 2/2004 | Gibisch et al. |
| 2004/0074467 A1 | 4/2004 | Hamada et al. |
| 2004/0092405 A1 | 5/2004 | Konishi et al. |
| 2004/0105806 A1 | 6/2004 | Griffin et al. |
| 2004/0109621 A1 | 6/2004 | Frost |
| 2004/0115435 A1 | 6/2004 | Griffin et al. |
| 2004/0133301 A1 | 7/2004 | Van Doren et al. |
| 2004/0154570 A1 | 8/2004 | Mabuchi et al. |
| 2004/0168326 A1 | 9/2004 | Korb et al. |
| 2004/0184687 A1 | 9/2004 | Morales et al. |
| 2004/0223256 A1 | 11/2004 | Feng et al. |
| 2004/0241448 A1 | 12/2004 | Kano et al. |
| 2004/0244539 A1 | 12/2004 | Korb et al. |
| 2004/0261614 A1 | 12/2004 | Hamada et al. |
| 2005/0001201 A1 | 1/2005 | Bocko et al. |
| 2005/0005892 A1 | 1/2005 | Nishimura et al. |
| 2005/0025975 A1 | 2/2005 | Okamoto et al. |
| 2005/0035222 A1 | 2/2005 | Hamada et al. |
| 2005/0037879 A1 | 2/2005 | Murata et al. |
| 2005/0056241 A1 | 3/2005 | Nomura et al. |
| 2005/0061291 A1 | 3/2005 | Nishimura et al. |
| 2005/0061636 A1 | 3/2005 | Frost et al. |
| 2005/0064196 A1 | 3/2005 | Martin et al. |
| 2005/0082139 A1 | 4/2005 | Ishikawa et al. |
| 2005/0084390 A1 | 4/2005 | Ueno et al. |
| 2005/0089685 A1 | 4/2005 | Hamada et al. |
| 2005/0098134 A1 | 5/2005 | Nishimura et al. |
| 2005/0100701 A1 | 5/2005 | Hamada et al. |
| 2005/0115744 A1 | 6/2005 | Griffin et al. |
| 2005/0188942 A1 | 9/2005 | Hamada et al. |
| 2006/0093839 A1 | 5/2006 | Okamoto et al. |
| 2006/0207540 A1 | 9/2006 | Matsui et al. |
| 2006/0263604 A1 | 11/2006 | Martin et al. |
| 2007/0060483 A1 | 3/2007 | Konishi et al. |

FOREIGN PATENT DOCUMENTS

| | | |
|---|---|---|
| DE | 196 44 374 A1 | 4/1998 |
| DE | 101 45 920 A1 | 4/2003 |
| GB | 2 205 108 A | 11/1988 |
| JP | 59-082508 A | 5/1984 |
| JP | 2000-136828 A | 5/2000 |
| WO | WO-2005/014761 A2 | 2/2005 |
| WO | WO-2005/014763 A1 | 2/2005 |
| WO | WO-2006/075219 A2 | 7/2006 |

OTHER PUBLICATIONS

U.S. Appl. No. 10/468,713, filed Aug. 22, 2003, Mabuchi et al.
U.S. Appl. No. 09/545,181, Apr. 7, 2000, Miyake et al.
Takahiro Hamada, Takafumi Ueno, Yutaka Mabuchi, Makoto Kano, "Evaluation of DLC Thin Film Deposition Using Pin-Disk Apparatus," Proceedings of JAST Tribology Conference, Tokyo, Japan, May 2004.
Takahiro Hamada, Takafumi Ueno, Yutaka Mabuchi, Makoto Kano, Power Point Presentation Titled: "Evaluation of DLC Thin Film Deposition Using Pin-Disk Apparatus" Shown During Meeting of Japanese Society of Tribologists Held on May 10-12, 2004 in Tokyo, Japan.
J. Chen et al., "Review of Research in Preparation and Characterization of Diamond Film," Journal of the University of Petroleum, China, vol. 20 suppl., Jul. 1996, pp. 116-121.
Y. Yang et al., "Diamond-Like Carbon Film and Its Applications," Aerospace Materials and Technology, vol. 1, 1996, p. 13-16.
R. Ni et al., "Latest Development of Hydrogen-Free Diamond-Like Carbon Films," Vacuum Science and Technology (China), May 6, 2003, pp. 176-186.

* cited by examiner

ROLLING ELEMENT

CROSS-REFERENCE TO RELATED APPLICATIONS

This application has the following related applications: U.S. patent application Ser. No. 09/545,181 based on Japanese Patent Application Hei-11-102205 filed Apr. 9, 1999; Ser. No. 10/468,713 which is the designated state (United States) application number of PCT application JP02/10057 based on Japanese Patent Application 2001-117680 filed Apr. 17, 2001; Ser. No. 10/355,099 based on Japanese Patent Application 2002-45576 filed Feb. 22, 2002; 10/682,559 based on Japanese Patent Application No. 2002-302205 filed Oct. 16, 2002; and Ser. No. 10/692,853 based on Japanese Patent Application 2002-322322 filed Oct. 16, 2002.

BACKGROUND OF THE INVENTION

This invention relates to improvements in a rolling element such as a cam follower and a rolling bearing, more particularly to a rolling element including constituting members formed of an iron-based material and a diamond-like carbon (DLC) material exhibiting a highly excellent low friction characteristics in presence of a specified lubricating oil or a lubricant, and to a lubricating oil composition for largely improving a friction characteristics at a sliding surface of the iron-based material and the DLC material.

Global environmental problems such as global warming and ozone layer destruction are coming to the fore. As it has been said that the global warming is significantly affected by $CO_2$ emission, the reduction of $CO_2$ emission, notably the setting of $CO_2$ emission standards, has become a big concern to each country. One of challenges to reduce $CO_2$ emission is to improve vehicle fuel efficiency that depends on the performance of engine sliding members and a lubricating oil applied thereto. There are the following approaches to improving vehicle fuel efficiency: (1) lowering the viscosity of the lubricating oil, thereby reducing viscous resistance in hydrodynamic lubrication regions and agitation resistance in the engine; and (2) to adding a suitable friction modifier and other additives into the lubricating oil so as to reduce friction losses under the conditions of mixed lubrication and boundary lubrication.

In view of the foregoing, many studies have been made on various friction modifiers including organomolybdenum compounds, such as molybdenum dithiocarbamate (MoDTC) and molybdenum dithiophosphate (MoDTP). As a result of the studies, it has been found that the lubricating oil containing an organomolybdenum compound successfully produces a friction reducing effect on the steel sliding members in the early stages of use.

SUMMARY OF THE INVENTION

Heretofore, the application of hard coating materials to the engine sliding members has been also examined so that the sliding members can attain high abrasion resistance and a low friction coefficient. Above all, a diamond-like carbon (DLC) material is known for its low-friction performance in the air and therefore expected to be useful as a coating material for the sliding members.

However, the DLC material does not provide a low friction coefficient in the presence of a lubricating oil, as disclosed in Japan Tribology Congress 1999. 5, Tokyo, Proceeding Page 11-12, KANO et al. Even when used in combination with the lubricating oil containing an organomolybdenum compound, the DLC material cannot provide a sufficiently low friction coefficient, as disclosed in World Tribology Congress 2001. 9, Vienna, Proceeding Page 342, KANO et al.

It is therefore an object of the present invention to provide an improved rolling element, by which drawbacks encountered in conventional rolling elements can be effectively overcome.

Another object of the present invention is to provide an improved rolling element which can exhibit a highly excellent low friction characteristics using a DLC material coated on a sliding surface(s) of constituting members of the rolling element.

Another object of the present invention is to provide an improved rolling element such as a cam follower or a rolling bearing, which can exhibit a highly excellent low friction characteristics upon combination of a DLC material and a specified lubricating oil or lubricant, as compared with a conventional rolling element using the combination of steel and organomolybdenum compound.

A first aspect of the present invention resides in a rolling element comprising a first member. A second member is coaxially disposed to the first member and rotatably movable relative to the first member. Additionally, a diamond-like carbon material is coated on a sliding surface of at least one of the first and second members.

A second aspect of the present invention resides in a cam follower comprising a cylindrical and hollow outer roller having an outer peripheral surface in slidable contact with a cam. A fixed pin is coaxially disposed inside the outer roller and rotatably movable relative to the outer roller. Additionally, a diamond-like carbon material is coated on a sliding surface of at least the fixed pin.

A third aspect of the present invention resides in a roller rocker arm comprising a cylindrical and hollow outer roller having an outer peripheral surface in slidable contact with a cam. A fixed pin is coaxially disposed inside the outer roller and rotatably movable relative to the outer roller. Additionally, a diamond-like carbon material is coated on a sliding surface of at least fixed pin.

A fourth aspect of the present invention resides in a low friction sliding combination of a cam and a cam follower which are in slidable contact with each other in presence of a lubricating oil which contains at least one of ashless fatty acid ester friction modifier and ashless aliphatic amine friction modifier. The cam follower comprises a cylindrical and hollow outer roller having an outer peripheral surface in slidable contact with the cam; a fixed pin coaxially disposed inside the outer roller and rotatably movable relative to the outer roller; and a diamond-like carbon material coated on a sliding surface of at least one of the outer roller and the fixed pin.

A fifth aspect of the present invention resides in a lubricating oil composition used in a low friction sliding combination of a cam and a cam follower. The cam follower includes a cylindrical and hollow outer roller having an outer peripheral surface in slidable contact with the cam; a fixed pin coaxially disposed inside the outer roller and rotatably movable relative to the outer roller; and a diamond-like carbon material coated on a sliding surface of at least one of the outer roller and the fixed pin, the cam and the cam follower being in slidable contact with each other in presence of the lubricating oil composition. The lubricating oil composition contains at least one of ashless fatty acid ester friction modifier and ashless aliphatic amine friction modifier, having a hydrocarbon chain having a carbon number ranging from 6 to 30 and contained in an amount of 0.05 to 3.0% by mass based on a total mass of the lubricating oil composition.

A sixth aspect of the present invention resides in a rolling bearing comprising an outer race. An inner race is coaxially disposed inside the outer race and rotatably movable relative to the outer race. Rolling members are rotatably disposed between the outer race and the inner race. Additionally, a diamond-like carbon material is coated on a sliding surface of at least one of the outer race, the inner race and the rolling members.

DETAILED DESCRIPTION OF THE INVENTION

The present invention will be discussed below in detail. In the following description, all percentages (%) are by mass unless otherwise specified.

First Embodiment

A first embodiment of a rolling element (cam follower) according to the present invention will be discussed with reference to FIGS. 1 and 2.

Figure 1:
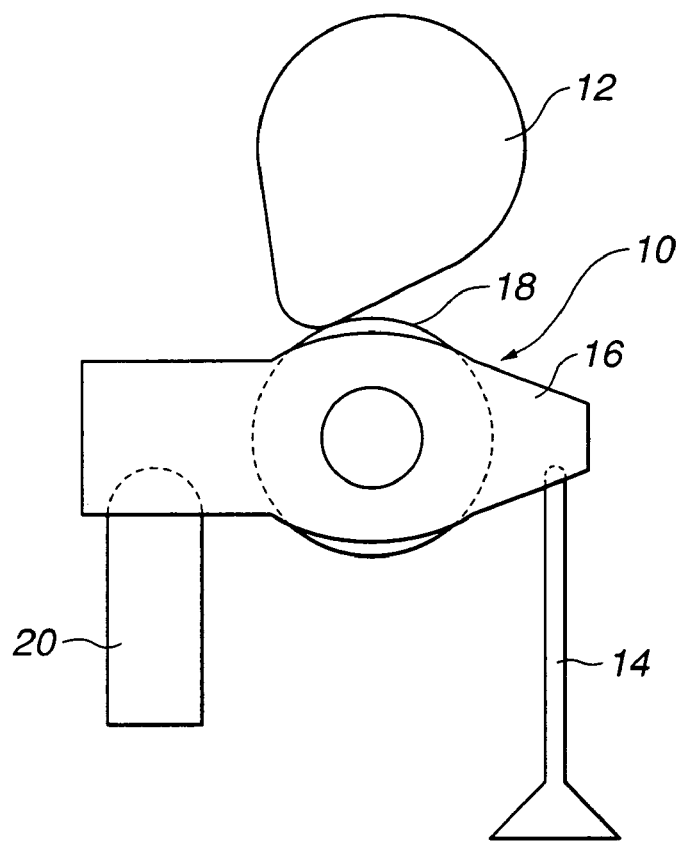
FIG. 1 is a schematic illustration of a roller rocker arm including a first embodiment of a rolling element (cam follower) according to the present invention.
Figure 2:
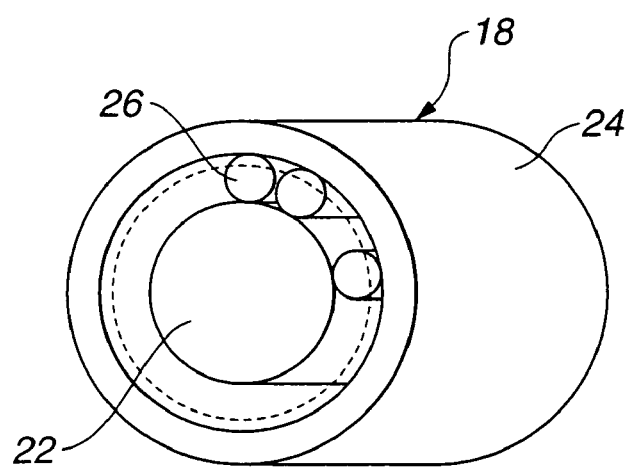
FIG. 2 is a schematic perspective view of the rolling element of FIG. 1.

Referring now to FIG. 1, roller rocker arm 10 is shown to mechanically connect cam (or camshaft) 12 and valve 14 such as an engine (intake or exhaust) valve of an internal combustion engine. Roller rocker arm 10 includes rocker arm main body 16 provided with cam follower 18. Cam follower 18 is in slidable contact with cam 12. Rocker arm main body 16 is supported at its one end by a pivot 20 and connected at the other end with valve 14, so that rotational movement of cam 12 is transmitted through cam follower 18 to valve 14.

Cam follower 18 includes fixed pin 22 which is fixed to rocker arm main body 16. Cylindrical outer roller 24 is coaxially disposed around fixed pin 22, defining an annular space between fixed pin 22 and outer roller 24. Needles 26 are interposed between fixed pin 22 and outer roller 24. It will be understood that needles 26 may be omitted so that the inner peripheral surface of outer roller 24 is directly in slidable contact with the outer peripheral surface of fixed pin 22. Fixed pin 22 includes a base material formed of an iron-based material (alloy) corresponding to a high carbon chromium bearing steel "SUJ2" according to JIS (Japanese Industrial Standard) G4805. The outer peripheral surface of fixed pin 22 formed of base material is coated with a DLC (diamond-like carbon) material. Each of outer roller 24 and each needle 26 is formed of an iron-based material (alloy) which is the same as or similar to the iron-based material of the base material of fixed pin 22. The outer peripheral surface of each of outer roller 24 and each needle 26 may be coated with the DLC material to form a DLC coating, if necessary. No coating may be formed at the inner peripheral surface of outer roller 24 so that the iron-based material is exposed at the inner peripheral surface of outer roller 24. Cam 12 is formed of, for example, a low alloy chilled cast iron, a carburized steel, or a heat treated carbon steel and in slidable contact with the outer peripheral surface of outer roller 24 which is coated with the DLC material at need. Fixed pin 22, needles 26, outer roller 24 and cam 12 are in slidable contact with each other in presence of a lubricating oil (composition) which contains at least one of an ashless fatty acid ester (ester of fatty acid) friction modifier and an ashless aliphatic amine friction modifier, so that fixed pin 22, needles 26, outer roller 24 and cam 12 (referred also as "constituting member(s)") can make their sliding movement under an extremely low friction.

Here, the DLC (diamond-like carbon) material is mainly constituted of carbon (element) and amorphous, taking a diamond structure ($SP^3$ bonding) or a graphite structure ($SP^2$ bonding) in mode among carbons. More specifically, the hard carbon (DLC) thin film is formed of hydrogen-free amorphous carbon (a-C) that consists of carbon, hydrogen-containing amorphous carbon (a-C:H), or metal carbide or metal containing carbon (MeC) that contains as a part a metal element of titanium (Ti) or Molybdenum (Mo). For a significant reduction in friction, the DLC material is preferably as low as possible in hydrogen content and therefore has a hydrogen content of not more than 1 atomic %, and preferably formed of hydrogen-free amorphous carbon (a-C).

The surface of the base material of each constituting member to be coated with the DLC material preferably has a surface roughness (Ra) of not larger than 0.1 μm. Additionally, the surface roughness (Ra) of the constituting member in slidable contact with the coated DLC material to serve as an opposite member and formed of the iron-based material is preferably not larger than 0.1 μm. These are suitable from the viewpoint of obtaining stability in sliding movement. If the surface roughness exceeds 0.1 μm, the constituting member makes its local scuffing and is largely increased in friction coefficient. The surface roughness (Ra) is explained as $R_{a75}$ in JIS (Japanese Industrial Standard) B 0601 (:2001).

The coating of the DLC material (referred hereinafter to as "DLC coating") formed on each constituting member preferably has a surface hardness or micro Vickers hardness (Hv) ranging from 1000 to 3500 as measured under application of a 10 g load and a thickness ranging from 0.3 to 2.0 μm. Additionally, the sliding surface (in slidable contact with the DLC coating) of the opposite member formed of the iron-based material preferably has a surface roughness or micro Vickers hardness Hv ranging from 450 to 800 and has a Rockwell hardness (HRC) ranging from 45 to 60. These are effective for maintaining the durability of the DLC coating even under a high Hertz's contact pressure of about 700 MPa. If the surface hardness and thickness of the DLC coating are out of the above ranges, wear of the DLC coating will occur in case that the surface hardness (Hv) is smaller than 1000 and the thickness is smaller than 0.3 μm, whereas peeling-off of the DLC coating tends to occur in case that the surface hardness (Hv) exceeds 3500 and the thickness is smaller than 2.0 μm. Additionally, if the surface hardness (Hv) of the iron-based material member as the opposite member is out of the above range, buckling of the DLC coating tends to occur in case of being smaller than 450, whereas a further effect in wear reduction cannot be found even in case of exceeding 800.

It is to be noted that, as discussed above, fixed pin 22, needles 26, outer roller 24 and cam 12 are in slidable contact with each other in presence of the lubricating oil (composition) which will be discussed hereinafter.

The lubricating oil (composition) includes a base oil and at least one of the ashless fatty acid ester (ester of fatty acid) friction modifier and the ashless aliphatic amine friction modifier. In other words, the ashless fatty acid ester friction modifier and/or aliphatic amine friction modifier are/is contained in the base oil. The base oil is not particularly limited and can be any base oil (compound or compounds) commonly used for a lubricating oil, such as a mineral oil, a synthetic oil, an oil and fat (compound), or any combination of the mineral oil, the synthetic oil and the oil and fat.

Specific examples of the mineral oil include paraffin-based or naphthene-based oil, and n-paraffin, prepared by extracting a lubricating oil fraction from petroleum by atmospheric or reduced-pressure distillation, and then, purifying the obtained lubricating oil fraction by using at least one of the following treatments: solvent deasphalting, solvent extraction, hydrogenolysis, solvent dewaxing, hydrogenation purification, sulfuric acid treatment, clay treatment and the like which may be used in suitable combination. It is general to purify the obtained lubricating oil fraction by using hydrogenation purification or solvent purification. Additionally, it is preferable to use the mineral oil which is obtained by purifying the lubricating oil fraction using high-hydrogenolysis process which is capable of largely decreasing aromatic components, or the mineral oil produced by a process for isomerizing GTL (gas to liquid) Wax.

Specific examples of the synthetic oil include: poly-α-olefins (such as 1-octene oligomer, 1-decene oligomer and ethylene-propylene oligomer), hydrides of poly-α-olefins, isobutene oligomers, hydrides of isobutene oligomers, isoparaffins, alkylbenzenes, alkylnaphthalenes, diesters (such as ditridecyl glutarate, dioctyl adipate, diisodecyl adipate, ditridecyl adipate and dioctyl sebacate), polyol esters (such as trimethylolpropane caprylate; trimetylolpropane pelargonate; trimethylolpropane ester such as trimethylolpropane isostearinate; pentaerythritol ester such as pentaerythritol-2-ethyl hexanoate and pentaerythritol pelargonate), polyoxyalkylene glycol, dialkyldiphenyl ether, and polyphenyl ether. Among these synthetic oil compounds, preferred are poly-α-olefins, such as 1-octene oligomer and 1-decene oligomer and hydrides thereof.

The above-mentioned mineral and synthetic oil (compounds) may be used alone, or in the form of a mixture of any two or more thereof with no limitation on the mixture ratio.

The sulfur content of the base oil is not particularly restricted. The sulfur content is preferably not more than 0.2%, more preferably not more than 0.1%, much more preferably not more than 0.05%. Additionally, it is preferable to use, as the base oil, mineral oil which is purified by hydrogenation or synthetic oil because such oil has a sulfur content of not more than 0.005% or substantially no sulfur content (not more than 5 ppm).

The aromatic content of the base oil is also not particularly restricted. The aromatic content of the base oil is preferably 15% or less, more preferably 10% or less, and most preferably 5% or less in order that the lubricating oil for internal combustion engines maintain its low friction characteristics for a long time. When the aromatic content exceeds 15%, the base oil undesirably deteriorates in oxidation stability. Herein, the aromatic content is defined as the amount of aromatics fractions determined according to ASTM D2549 "Standard Test Method for Separation of Representative Aromatics and Non-aromatics Fractions of High-Boiling Oils by Elution Chromatography".

The kinematic viscosity of the base oil is not particularly restricted. When the lubricating oil is used for an internal combustion engine, the kinematic viscosity of the base oil is preferably 2 mm$^2$/s or higher, more preferably 3 mm$^2$/s and, at the same time, is preferably 20 mm$^2$/s or lower, more preferably 10 mm$^2$/s or lower, most preferably 8 mm$^2$/s or lower, as measured at 100° C. When the kinematic viscosity is lower than 2 mm$^2$/s at 100° C., the lubricating oil can provide a sufficient wear resistance and be inferior in vaporization characteristics. When the kinematic viscosity exceeds 20 mm$^2$/s, the lubricating oil is difficult to exhibit a low frictional characteristics and may be degraded in vaporization characteristics, which are not preferable. In connection with the present invention, at least two base oils may be freely selected to be mixed to form a mixture, in which the kenematic viscosity of the single base oil may be out of the above-mentioned range as far as the kinematic viscosity of the mixture at 100° C. falls within the above-mentioned preferable range.

The viscosity index of the base oil is not particularly restricted, and is preferably 80 or higher, more preferably 100 or higher, most preferably 120 or higher, when the lubricating oil is used for an internal combustion engine. Increasing the viscosity index of the base oil can provide the lubricating oil for the internal combustion engine, excellent in low temperature viscosity characteristics and fuel economy performance.

Examples of the fatty acid ester friction modifier and the aliphatic amine friction modifier are an fatty acid ester and an aliphatic amine each having $C_6$-$C_{30}$ straight or branched hydrocarbon chains or groups, preferably $C_8$-$C_{24}$ straight or branched hydrocarbon chains, more preferably $C_{10}$-$C_{20}$ straight or branched hydrocarbon chains. When the carbon number of the hydrocarbon chain is not within the range of 6 to 30, there arises a possibility that the lubricating oil may not produce a sufficient friction reducing effect as expected. It will be understood that a suitable mixture of fatty acid ester and the aliphatic amine may be used.

Specific examples of the $C_6$-$C_{30}$ straight or branched hydrocarbon chain include: alkyl groups, such as hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl, tetracosyl, pentacosyl, hexacosyl, heptacosyl, octacosyl, nonacosyl and triacontyl; and alkenyl groups, such as hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, icosenyl, heneicosenyl, docosenyl, tricosenyl, tetracosenyl, pentacosenyl, hexacosenyl, heptacosenyl, octacosenyl, nonacosenyl and triacontenyl. The above alkyl and alkenyl groups include all possible isomers. Additionally, the position of alkenyl groups is free.

The fatty acid ester can be exemplified by esters of fatty acids having the above $C_6$-$C_{30}$ hydrocarbon groups or chains and monohydric or polyhydric aliphatic alcohols. Specific examples of such fatty acid esters include glycerol monooleate, glycerol dioleate, sorbitan monoleate and sorbitan dioleate.

The aliphatic amine can be exemplified by aliphatic monoamines and alkylene oxide adducts thereof, aliphatic polyamines, imidazoline compounds, and derivatives thereof. Specific examples of such aliphatic amines include: aliphatic amine compounds, such as laurylamine, lauryldiethylamine, lauryldiethanolamine, dodecyldipropanolamine, palmitylamine, stearylamine, stearyltetraethylenepentamine, oleylamine, oleylpropylenediamine, oleyldiethanolamine and N-hydroxyethyloleylimidazolyne; adducts of the above aliphatic amines ($C_6$-$C_{28}$ alkyl or alkenyl amines) with alkylene oxides, such as N,N-dipolyoxyalkylene-N-alkylamines; and acid-modified compounds prepared by reacting the above aliphatic amines with $C_2$-$C_{30}$ monocarboxylic acids (such as fatty acids) or $C_2$-$C_{30}$ polycarboxylic acids (such as oxalic acid, phthalic acid, trimellitic acid and pyromellitic acid) so as to neutralize or amidate the whole or part of the remaining amino and/or imino groups. In connection with the present invention, N,N-dipolyoxyethylene-N-oleylamine is preferably used.

The amount of the fatty acid ester friction modifier and/or the aliphatic amine friction modifier added in the lubricating oil is not particularly restricted, and is preferably 0.05 to 3.0%, more preferably 0.1 to 2.0%, and most preferably 0.5 to 1.4%, based on the total mass of the lubricating oil. When the amount of the fatty acid ester friction modifier and/or the aliphatic amine friction modifier is less than 0.05%, there arises a possibility that the lubricating oil may not produce a sufficient friction reducing effect. When the amount of the fatty acid ester friction modifier and/or the aliphatic amine friction modifier exceeds 3.0%, the lubricating oil produce a good friction reducing effect but undesirably deteriorates in storage stability and compatibility to cause precipitations.

Further, the lubricating oil preferably includes polybutenyl succinimide and/or a derivative thereof as an ashless dispersant. Specific examples of the polybutenyl succinimide usable in connection with the present invention include compounds represented by the following general formulas (1) and (2).

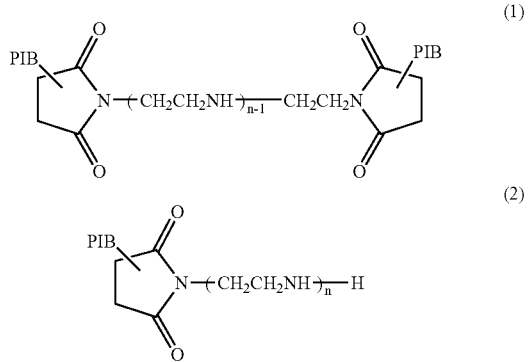

In each of the formulas (1) and (2), n represents an integer of 1 to 5, preferably 2 to 4, so as to attain a good detergent effect. Further, PIB represents a polybutenyl group derived from polybutene. The polybutene can be prepared by polymerizing high-purity isobutene or a mixture of 1-butene and isobutene in the presence of a boron fluoride catalyst or an aluminum chloride catalyst in such a manner that the polybutene attains a number-average molecular weight of 900 to 3,500, preferably 1,000 to 2,000. When the number-average molecular weight of the polybutene is less than 900, there is a possibility of failing to attain a sufficient detergent effect. When the number-average molecular weight of the polybutene exceeds 3,500, the polybutene may undesirably deteriorate in low-temperature fluidity. In the production of the polybutenyl succinimide, the polybutene may be used after purified by removing trace amounts of fluorine and chlorine residues, which result from the above polybutene production catalyst, by any suitable treatment (such as adsorption process or washing process). The amount of the fluorine and chlorine residues is preferably controlled to 50 ppm or less, more preferably 10 ppm or less, most preferably 1 ppm or less.

The production method of the polybutenyl succinimide is not particularly restricted. For example, the polybutenyl succinimide can be prepared by reacting an chloride of the above-mentioned polybutene, or the polybutene from which fluorine and chlorine residues are removed, with maleic anhydride at 100 to 200° C. to form polybutenyl succinate, and then, reacting the thus-formed polybutenyl succinate with polyamine (such as diethylene triamine, triethylene tetramine, tetraethylene pentamine or pentaethylene hexamine).

The polybutenyl succinimide derivative can be exemplified by boron- and acid-modified compounds obtained by reacting the polybutenyl succinimide of the formulas (1) and (2) with boron compounds or oxygen-containing organic compounds so as to neutralize or amidate the whole or part of the remaining amino and/or imide groups. Among these, boron-containing polybutenyl succinimide, especially boron-containing bis(polybutenyl)succinimide, is preferably used.

The above boron compound can be a boric acid, a borate or a boric acid ester. Specific examples of the boric acid include orthoboric acid, metaboric acid and paraboric acid. Specific examples of the borate include: ammonium salts including ammonium borates, such as ammonium metaborate, ammonium tetraborate, ammonium pentaborate and ammonium octaborate. Specific examples of the boric acid ester include: esters of boric acids and alkylalcohols (preferably $C_1$-$C_6$ alkylalcohols), such as monomethyl borate, dimethyl borate, trimethyl borate, monoethyl borate, diethyl borate, triethyl borate, monopropyl borate, dipropyl borate, tripropyl borate, monobutyl borate, dibutyl borate and tributyl borate. Herein, the content ratio of nitrogen to boron (B/N) by mass in the boron-containing polybutenyl succinimide is usually 0.1 to 3, preferably 0.2 to 1.

The above oxygen-containing organic compound can be exemplified by: $C_1$-$C_{30}$ monocarboxylic acids, such as formic acid, acetic acid, glycolic acid, propionic acid, lactic acid, butyric acid, valeric acid, caproic acid, enanthic acid, caprylic acid, pelargonic acid, capric acid; undecylic acid, lauric acid, tridecanoic acid, myristic acid, pentadecanoic acid, palmitic acid, margaric acid, stearic acid, oleic acid, nonadecanoic acid and eicosanoic acid; $C_2$-$C_{30}$ polycarboxylic acids, such as oxalic acid, phthalic acid, trimellitic acid and pyromellitic acid, and anhydrides and esters thereof; $C_2$-$C_6$ alkylene oxides; and hydroxy(poly)oxyalkylene carbonates.

The amount of the polybutenyl succinimide and/or derivative thereof added in the lubricating oil is not particularly restricted, and is preferably 0.1 to 15%, more preferably 1.0 to 12%, based on the total mass of the lubricating oil. When the amount of the polybutenyl succineimide and/or the derivative thereof is less than 0.1%, there arises a possibility of failing to attain a sufficient detergent effect. It becomes uneconomical when the amount of the polybutenyl succineimide and/or the derivative thereof exceeds 15%. In addition, such a large amount of the polybutenyl succineimide and/or the derivative thereof tends to cause a deterioration in demulsification ability.

Furthermore, the lubricating oil preferably includes zinc dithiophosphate represented by the following general formula (3) as an antioxidant and as an anti-wear agent.

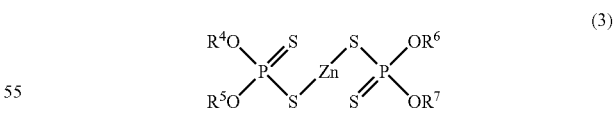

In the general formula (3), $R^4$, $R^5$, $R^6$ and $R^7$ each represent $C_1$-$C_{24}$ hydrocarbon groups. The $C_1$-$C_{24}$ hydrocarbon group is preferably a $C_1$-$C_{24}$ straight-chain or branched-chain alkyl group, a $C_3$-$C_{24}$ straight-chain or branched-chain alkenyl group, a $C_5$-$C_{13}$ cycloalkyl or straight-chain or branched-chain alkylcycloalkyl group, a $C_6$-$C_{18}$ aryl or straight-chain or branched-chain alkylaryl group, or a $C_7$-$C_{19}$ arylalkyl group. The above alkyl group or alkenyl group can be primary, secondary or tertiary. Specific examples of $R^4$, $R^5$, $R^6$ and $R^7$ include: alkyl groups, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, heneicosyl, docosyl, tricosyl and tetracosyl; alkenyl groups, such as propenyl, isopropenyl, butenyl, butadienyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl (oleyl), nonadecenyl, icosenyl, heneicosenyl, docosenyl, tricosenyl and tetracosenyl; cycloalkyl groups, such as cyclopentyl, cyclohexyl and cycloheptyl; alkylcycloalkyl groups, such as methylcyclopentyl, dimethylcyclopentyl, ethylcyclopentyl, propylcyclopentyl, ethylmethylcyclopentyl, trimethylcyclopentyl, diethylcyclopentyl, ethyldimethylcyclopentyl, propylmethylcyclopentyl, propylethylcyclopentyl, di-propylcyclopentyl, propylethylmethylcyclopentyl, methylcyclohexyl, dimethylcyclohexyl, ethylcyclohexyl, propylcyclohexyl, ethylmethylcyclohexyl, trimethylcyclohexyl, diethylcyclohexyl, ethyldimethylcyclohexyl, propylmethylcyclohexyl, propylethylcyclohexyl, di-propylcyclohexyl, propylethylmethylcyclohexyl, methylcycloheptyl, dimethylcycloheptyl, ethylcycloheptyl, propylcycloheptyl, ethylmethylcycloheptyl, trimethylcycloheptyl, diethylcycloheptyl, ethyldimethylcycloheptyl, propylmethylcycloheptyl, propylethylcycloheptyl, di-propylcycloheptyl and propylethylmethylcycloheptyl; aryl groups, such as phenyl and naphthyl; alkylaryl groups, such as tolyl, xylyl, ethylphenyl, propylphenyl, ethylmethylphenyl, trimethylphenyl, butylphenyl, propylmethylphenyl, diethylphenyl, ethyldimethylphenyl, tetramethylphenyl, pentylphenyl, hexylphenyl, heptylphenyl, octylphenyl, nonylphenyl, decylphenyl, undecylphenyl and dodecylphenyl; and arylalkyl groups, such as benzyl, methylbenzyl, dimethylbenzyl, phenethyl, methylphenethyl and dimethylphenethyl. The above hydrocarbon groups include all possible isomers.

The above-mentioned hydrocarbon groups formable with $R^4$, $R^5$, $R^6$ and $R^7$ include all considerable straight or branched chain structures. The position of double bond of alkenyl group, the bonding position of alkyl group to cycloalkyl group and the bonding position of alkyl group to aryl group are free. Among the above-mentioned hydrocarbon groups, especially preferable ones are straight or branched alkyl groups having a carbon number ranging from 1 to 18, aryl groups having a carbon number ranging from 6 to 18, and straight or branched alkylaryl groups.

Specific examples of the zinc dithiophosphate usable in connection with the present invention include zinc diisopropyldithiophosphate, zinc diisobutyldithiophosphate, zinc di-sec-butyldithiophosphate, zinc di-sec-pentyldithiophosphate, zinc di-n-hexyldithiophosphate, zinc di-sec-hexyldithiophosphate, zinc di-octyldithiophosphate, zinc di-2-ethylhexyldithiophosphate, zinc di-n-decyldithiophosphate, zinc di-n-dodecyldithiophosphate, zinc diisotridecyldithiophosphate and mixtures thereof.

The amount of the zinc dithiophosphate added in the lubricating oil is not particularly restricted. The zinc dithiophosphate is preferably contained in an amount of 0.1% or less, more preferably in an amount of 0.06% or less, most preferably in a minimum effective amount, in terms of the phosphorus element based on the total mass of the lubricating oil in order to produce a higher friction reducing effect. When the amount of the zinc dithiophosphate exceeds 0.1%, there arises a possibility of inhibiting the effect of the ashless fatty acid ester friction modifier and/or the ashless aliphatic amine friction modifier, particularly at a sliding surface (plane) between the DLC thin film and the opposite member formed of iron-based material.

The zinc dithiophosphate can be prepared by any known method. For example, the zinc dithiophosphate may be prepared by reacting alcohols or phenols having the above $R^4$, $R^5$, $R^6$ and $R^7$ hydrocarbon groups with phosphorous pentasulfide to form dithiophosphoric acid, and then, neutralizing the thus-formed dithiophosphoric acid with zinc oxide. Herein, the molecular structure of zinc dithiophosphate differs according to the alcohols or phenols used as a raw material for the zinc dithiophosphate production. It will be understood that at least two kinds of zinc dithiophosphates represented by the above general formula (3) may be mixed at suitable ratio so as to be used.

As discussed above, in connection with the present invention, the lubricating oil can provide an extremely excellent low friction characteristics in case of being used between the member provided with the DLC coating and the member formed of the iron-based material. In order to raise performances required particularly for the lubricating oil (composition) of internal combustion engines, the lubricating oil may contain other additives, such as a metallic detergent, an antioxidant, a viscosity index improver, a friction modifier other than the above-mentioned fatty acid ester friction modifier and/or the aliphatic amine friction modifier, an ashless dispersant other than the above-mentioned polybutenyl succinimide and/or the derivative thereof, an anti-wear agent or extreme-pressure additive, a rust inhibitor, a nonionic surfactant, a deemulsifier, a metal deactivator and/or an anti-foaming agent, when used in an internal combustion engine. These additives may be used alone or in the form of a mixture of two or more thereof so as to meet the lubricating oil performance required.

The metallic detergent can be any metallic-detergent compound commonly used for a lubricating oil. Specific examples of the metallic detergent usable in connection with the present invention include sulfonates, phenates and salicylates of alkali metals or alkali-earth metals; and mixtures of two or more thereof. Examples of the alkali metals include sodium (Na) and potassium (K), and examples of the alkali-earth metals include calcium (Ca) and magnesium (Mg). In connection with the present invention, sodium and calcium sulfonates, sodium and calcium phenates, and sodium and calcium salicylates are suitably used. The total base number and amount of the metallic detergent can be selected in accordance with the lubricating oil performance required. The total base number of the metallic detergent is usually 0 to 500 mgKOH/g, preferably 150 to 400 mgKOH/g, as measured by perchloric acid method according to ISO 3771 "Determination of base number—Perchloric acid potentiometric titration method". The amount of the metallic detergent is usually 0.1 to 10% based on the total mass of the lubricating oil.

The antioxidant can be any antioxidant compound commonly used for a lubricating oil. Specific examples of the antioxidant usable in connection with the present invention include: phenolic antioxidants, such as 4,4'-methylenebis(2, 6-di-tert-butylphenol) and octadecyl-3-(3,5-di-tert-butyl-4-hydroxyphenyl)propionate; amino antioxidants, such as phenyl-α-naphthylamine, alkylphenyl-α-naphthylamine and alkyldiphenylamine; and mixtures of two or more thereof. The amount of the antioxidant is usually 0.01 to 5% based on the total mass of the lubricating oil.

The viscosity index improver can be exemplified by: non-dispersion type viscosity index improvers, such as copolymers of one or two monomers selected from various methacrylic acids, and hydrides of the copolymers; and dispersion type viscosity index improvers, such as copolymers of methacrylates (including nitrogen compounds). There may be also used, as the viscosity index improver, copolymers of ethylene and α-olefins (such as propylene, 1-butene and 1-pentene) and hydrides thereof, polyisobutylenes and hydrides thereof, a hydrogenated copolymer of styrene and diene, a copolymer of styrene and maleic anhydride and polyalkylstyrenes. The molecular weight of the viscosity index improver needs to be selected in view of shear stability. For example, the number-average molecular weight of the viscosity index improver is desirably in a range of 5,000 to 1,000,000, more desirably 100,000 to 800,000, for dispersion or non-dispersion type polymethacrylates; in a range of 800 to 5,000 for polyisobutylenes and hydrides thereof; and in a range of 800 to 300,000, more desirably 10,000 to 200,000 for ethylene/α-olefin copolymers and hydrides thereof. The above viscosity index improving compounds can be used alone or in the form of a mixture of two or more thereof. The amount of the viscosity index improver is preferably 0.1 to 40.0% based on the total mass of the lubricating oil.

The friction modifier other than the above-mentioned fatty acid ester friction modifier and/or the aliphatic amine friction modifier can be exemplified by ashless friction modifiers, such as boric acid esters, higher alcohols and aliphatic ethers, and metallic friction modifiers, such as molybdenum dithiophosphate, molybdenum dithiocarbamate and molybdenum disulfide.

The ashless dispersant other than the above-mentioned polybutenyl succinimide and/or the derivative thereof can be exemplified by polybutenylbenzylamines and polybutenylamines each having polybutenyl groups of number-average molecular weight of 900 to 3,500, polybutenyl succinimides having polybutenyl groups of number-average molecular weight of less than 900 and derivatives thereof.

The anti-friction agent or extreme-pressure additive can be exemplified by disulfides, sulfurized fats and oils, olefin sulfides, phosphate esters having one to three $C_2$-$C_{20}$ hydrocarbon groups, thiophosphate esters, phosphite esters, thiophosphite esters and amine salts of these esters.

The rust inhibitor can be exemplified by alkylbenzene sulfonates, dinonylnaphthalene sulfonates, esters of alkenylsuccinic acids and esters of polyhydric alcohols.

The nonionic surfactant and the deemulsifier can be exemplified by noionic polyalkylene glycol surfactants, such as polyoxyethylene alkylethers, polyoxyethylene alkylphenylethers and polyoxyethylene alkylnaphthyleters.

The metal deactivator can be exemplified by imidazoline compounds, pyrimidine derivatives, thiazole and benzotriazole.

The anti-foaming agent can be exemplified by silicones, fluorosilicones and fluoroalkylethers.

Each of the friction modifier other than the fatty acid ester friction modifier and/or the aliphatic amine friction modifier, the ashless dispersant other than the polybutenyl succinimide and/or the derivative thereof, the anti-wear agent or extreme-pressure additive, the rust inhibitor and the demulsifier is usually contained in an amount of 0.01 to 5% based on the total mass of the lubricating oil, and the metal deactivator is contained in an amount of 0.0005 to 1% based on the total mass of the lubricating oil.

EXPERIMENT 1

The present invention will be more readily understood with reference to the following Examples in comparison with Comparative Examples; however, these Examples are intended to illustrate the invention and are not to be construed to limit the scope of the invention.

[Production of Cam and Cam Follower]

A material of a cam or cam lobe piece made of chilled cast iron was cut out from a manufactured camshaft for a four-cylinder engine, thereby providing a cam lobe piece material. The cam lobe piece material was grinded to have a certain cam shape. Thereafter, the grinded cam lobe piece was lapped with a lapping tape in case that the cam lobe piece was to have a surface roughness (Ra) of not larger than 0.1μ, thus obtaining a cam or cam lobe piece as a specimen.

Each of a fixed pin, needles and an outer roller (referred hereinafter as to "constituting members") constituting a roller rocker arm were produced as follows: A material SUJ2 was processed or formed into a shape similar to a final product and then underwent a heat treatment hardening. The thus hardened material SUJ2 was subjected to a barrel lapping to have a surface roughness (Ra) of not larger than 0.1 μm. In case that the surface of the constituting member is coated with a (surface) coating, the lapped material SUJ2 was coated with each of a variety of coating materials (shown in Table 2A) by a PVD process or a CVD process to form the coating having a certain thickness.

The thus produced constituting members were assembled to form two types of roller rocker arms. One type is such that the fixed pin (22) was fastened to a rocker arm main body (16) by caulking upon the outer roller (24) being slidably mounted on the fixed pin without using the needles (26). The other type was such that the fixed pin (22) was fastened to a rocker arm main body (16) by caulking upon the outer roller (24) being mounted around the fixed pin through the needles (26) as shown in FIGS. 1 and 2. Thus, a roller rocker arm as a specimen was produced.

[Preparation of Lubricating Oil]

A mineral oil or a synthetic oil was used as a base oil. A variety of additives such as a variety of friction modifiers and others were blended to the base oil thereby preparing eight kinds of lubricating oils shown as "Lubricating oil (composition) Nos. 1 to 8" in Table 1. In Table 1, the mineral oil and the synthetic oil are represented as mass % relative to the total amount of the base oil, whereas the additives are represented as mass % relative to the total amount of the lubricating oil (composition).

[Friction Evaluation Test]

A friction evaluation test was conduced on each roller rocker arm by using a cam follower single member test apparatus simulating an engine cam follower, in which each roller rocker arm was set in slidable contact with the cam lobe piece which was driven. The cam lobe piece and the roller rocker arm including the fixed pin, and the outer roller (and the needles) had been prepared by using a variety of materials shown in Table 2A and 2B. In Table 2A, the hydrogen content of the coating material is represented as "atomic %". In Table 2B, the "reduction rate (%) of friction torque" is a rate of reduction of friction torque relative to the friction torque in Comparative Example 1-1 or 1-2 (represented as "Standard"). The friction evaluation test was conducted under the following conditions:

(a) Engine oil (lubricating oil) supply manner: dropping the oil;

(b) Temperature of the oil to be supplied: 80° C.;

(c) Maximum Hertz's contact pressure to be applied to the roller rocker arm: 700 MPa;

(d) Rotational speed of cam lobe piece: 600 r.p.m.; and (e) Test time: 60 min.

[Test Result]

As apparent from Tables 2A and 2B, excellent low friction torque characteristics can be exhibited in all the combinations of the roller rocker arms of Examples 1-1 to 1-8 according to the embodiment and the lubricating oils (oil compositions). It is confirmed that these combinations can provide a friction reduction effect of 10 to 30% relative to the combination of the roller rocker arm of Comparative Example 1-1 and a standard lubricating oil (composition). Additionally, it is also confirmed that no problem occurs in surface condition of the roller rocker arm of Examples, and that the roller rocker arms of Examples are highly excellent in wear resistance. The test results of Examples 1-1, 1-3 and 1-5 reveal that the friction reduction effect becomes high as the content of zinc dithiophosphate is less. The test results of Examples 1-7 and 1-8 reveal that the friction reduction effect can be improved by adding the coating of a-C (amorphous carbon) to the outer roller.

Furthermore, in Examples 1-9 to 1-12 in which the needles exist between the fixed pin and the outer roller, apparent friction reduction effects can be found as compared with Comparative Example 1-2 relating to the combination of the roller rocker arm used in a general gasoline-fueled engine and the standard engine oil (lubricating oil). Additionally, in Examples 1-9 to 1-12, it is confirmed that a further friction reduction effect can be obtained by adding the DLC coating of a-C to the surface of the needles. In Examples 1-13 to 1-17 which are out of appropriate conditions, peeling-off and wear of the coating occur under the conditions of the friction evaluation test.

As appreciated from the above, according to this embodiment, the roller rocker arm is constituted of the fixed pin provided with the coating of the DLC material, preferably the amorphous carbon (a-C:H) having a low hydrogen content, more preferably hydrogen-free amorphous carbon (a-C), the outer roller provided with the coating of the similar DLC material if necessary, and the needles assembled in the roller rocker arm if necessary. The roller rocker arm is in slidable contact with the cam (lobe piece) in presence of the lubricating oil (composition) containing the specified ashless friction modifier. Accordingly, this embodiment can provide the combination of the cam and the cam follower and the lubricating oil (composition) used in the combination, exhibiting highly excellent low friction characteristics and large reduction in friction loss while being highly effective for improving fuel economy of the engine.

TABLE 1

| | | | LUBRICATING OIL (COMPOSITION) NO. | | | | | | | |
|---|---|---|---|---|---|---|---|---|---|---|
| | | | 1 | 2 | 3 | 4 | 5 | 6 | 7 | 8 |
| COMPOSITION (MASS %) | BASE OIL | MINERAL OIL[1] | 100 | 100 | — | 100 | 100 | 100 | 100 | 100 |
| | | SYNTHETIC OIL[2] | — | — | 100 | — | — | — | — | — |
| | ADDITIVES | ESTER FRICTION MODIFIER[3] | 1.0 | 1.0 | 1.0 | — | 1.0 | 1.0 | 0.2 | — |
| | | AMINE FRICTION MODIFIER[4] | — | — | — | 1.0 | — | 0.5 | — | — |
| | | ASHLESS DISPERSANT[5] | 5.0 | 5.0 | 5.0 | 5.0 | 5.0 | 5.0 | 5.0 | 5.0 |
| | | ZINC DITHIOPHOSPHATE (IN TERMS OF PHOSPHOROUS ELEMENT)[6] | 0.00 | 0.047 | 0.047 | 0.047 | 0.094 | 0.094 | 0.047 | 0.094 |
| | | METALLIC DETERGENT (IN TERMS OF METAL ELEMENT)[7] | 0.15 | 0.15 | 0.15 | 0.15 | 0.15 | 0.15 | 0.15 | 0.15 |
| | | OTHERS[8] | 0.50 | 0.50 | 0.50 | 0.50 | 0.50 | 0.50 | 0.50 | 0.50 |
| | | OTHERS[9] | 0.90 | 0.90 | 0.90 | 0.90 | 0.90 | 0.90 | 0.90 | 0.90 |
| PROPERTIES | | KINEMATIC VISCOSITY AT 100° C. mm$^2$/s | 10.3 | 10.2 | 10.0 | 10.2 | 10.3 | 10.3 | 10.3 | 10.3 |
| | | TOTAL BASE NUMBER ACCORDING TO PERCHLORIC ACID METHOD mg KOH/g | 6.2 | 6.2 | 6.2 | 6.2 | 6.5 | 6.5 | 6.5 | 6.5 |
| | | TOTAL BASE NUMBER ACCORDING TO HYDROCHLORIC ACID METHOD mg KOH/g | 4.5 | 4.5 | 4.5 | 4.5 | 5.2 | 5.2 | 5.2 | 5.2 |

[NOTE]
[1] HYDROCRACKED MINERAL OIL (KINEMATIC VISCOSITY AT 100° C.: 5.0 mm$^2$/s, VISCOSITY INDEX: 120, AROMATIC CONTENT: 5.5 MASS %)
[2] 1-DECENE OLIGOMER HYDRIDE (KINEMATIC VISCOSITY AT 100° C.: 3.9 mm$^2$/s, VISCOSITY INDEX: 124, AROMATIC CONTENT: 0.0 MASS %)
[3] GLYCEROL MONOLATE
[4] N,N-DIPOLYOXYETHYLENE-N-OLEYLAMINE
[5] POLYBUTENYL SUCCINIMIDE (NITROGEN CONTENT: 1.2 MASS %)
[6] ZINC DIALKYLDITHIOPHOSPHATE (ZINC CONTENT: 9.3 MASS %, PHOSPHROUS CONTENT: 8.5 MASS %, ALKYL GROUP: SECONDARY BUTYL OR HEXYL GROUP)
[7] CALCIUM SULFONATE (TOTAL BASE NUMBER: 300 mg KOH/g, CALCIUM CONTENT: 12.0 MASS %)
[8] CALCIUM PHENATE (TOTAL BASE NUMBER: 255 mg KOH/g, CALCIUM CONTENT: 9.2 MASS %)
[9] INCLUDING VISCOSITY INDEX IMPROVER, ANTIOXIDANT, RUST INHIBITOR, DEMULSIFIER, NONIONIC SURFACTANT, METAL DEACTIVATOR AND ANTI-FOAMING AGENT

TABLE 2A

| | | FIXED PIN | | | | OUTER ROLLER | |
|---|---|---|---|---|---|---|---|
| | | SURFACE | | | SURFACE | | |
| ITEMS | | ROUGHNESS Ra (μm) | COATING MATERIAL | THICKNESS (μm) | HARDNESS (Hv) | COATING MATERIAL | THICKNESS (μm) |
| EXAMPLE | 1-1 | 0.03 | a-C | 1.1 | 1850 | NONE | — |
| | 1-2 | 0.10 | a-C | 2.0 | 1000 | NONE | — |
| | 1-3 | 0.03 | a-C | 1.4 | 1750 | NONE | — |
| | 1-4 | 0.02 | a-C | 0.9 | 2500 | NONE | — |
| | 1-5 | 0.02 | a-C | 0.3 | 3500 | NONE | — |

TABLE 2A-continued

| | | | | | | | |
|---|---|---|---|---|---|---|---|
| | 1-6 | 0.03 | a-C:H (1% H) | 1.5 | 1600 | NONE | — |
| | 1-7 | 0.02 | a-C | 0.9 | 2500 | a-C | 0.9 |
| | 1-8 | 0.02 | a-C | 0.9 | 2500 | a-C | 1.5 |
| | 1-9 | 0.02 | a-C | 0.8 | 2650 | NONE | — |
| | 1-10 | 0.02 | a-C | 0.8 | 2650 | a-C | 0.9 |
| | 1-11 | 0.03 | a-C | 1.4 | 1750 | a-C | 0.9 |
| | 1-12 | 0.03 | a-C | 1.4 | 1750 | a-C | 0.9 |
| | 1-13 | 0.03 | a-C:H (20% H) | 1.5 | 1400 | NONE | — |
| | 1-14 | 0.03 | a-C | 2.1 | 3550 | NONE | — |
| | 1-15 | 0.03 | a-C:H (1% H) | 0.2 | 1550 | NONE | — |
| | 1-16 | 0.03 | a-C | 0.8 | 2650 | a-C:H (20% H) | 0.2 |
| | 1-17 | 0.11 | a-C | 0.3 | 3500 | NONE | — |
| COMPARATIVE | 1-1 | 0.03 | NONE | — | 750 | NONE | — |
| EXAMPLE | 1-2 | 0.03 | NONE | — | 750 | NONE | — |

| | | OUTER ROLLER | | NEEDLES | | | |
|---|---|---|---|---|---|---|---|
| | | INNER | | | | | |
| ITEMS | | SURFACE HARDNESS (Hv) | SURFACE ROUGHNESS Ra (μm) | PRESENT OR NONE | SURFACE ROUGHNESS Ra (μm) | COATING MATERIAL | THICKNESS (μm) | SURFACE HARDNESS (Hv) |
| EXAMPLE | 1-1 | 750 | 0.08 | NONE | — | — | — | — |
| | 1-2 | 750 | 0.07 | NONE | — | — | — | — |
| | 1-3 | 750 | 0.09 | NONE | — | — | — | — |
| | 1-4 | 750 | 0.09 | NONE | — | — | — | — |
| | 1-5 | 750 | 0.10 | NONE | — | — | — | — |
| | 1-6 | 750 | 0.08 | NONE | — | — | — | — |
| | 1-7 | 2500 | 0.09 | NONE | — | — | — | — |
| | 1-8 | 1600 | 0.09 | NONE | — | — | — | — |
| | 1-9 | 750 | 0.08 | PRESENT | 0.02 | a-C | 0.8 | 2600 |
| | 1-10 | 2450 | 0.08 | PRESENT | 0.03 | a-C | 0.3 | 3450 |
| | 1-11 | 2450 | 0.08 | PRESENT | 0.02 | a-C | 0.8 | 2600 |
| | 1-12 | 2450 | 0.08 | PRESENT | 0.03 | a-C | 1.5 | 1500 |
| | 1-13 | 750 | 0.08 | NONE | — | — | — | — |
| | 1-14 | 750 | 0.08 | NONE | — | — | — | — |
| | 1-15 | 750 | 0.11 | NONE | — | — | — | — |
| | 1-16 | 1500 | 0.08 | NONE | — | — | — | — |
| | 1-17 | 750 | 0.08 | NONE | — | — | — | — |
| COMPARATIVE | 1-1 | 750 | 0.08 | NONE | — | — | — | — |
| EXAMPLE | 1-2 | 750 | 0.08 | PRESENT | 0.02 | NONE | — | 750 |

MATERIAL OF FIXED PIN, NEEDLS, OUTER ROLLER: SUJ2 HEAT-TREATED (HARDNESS Hv: 750)

TABLE 2B

| | | SURFACE ROUGHNESS Ra OF CAM (μm) | LUBRICATING OIL (COMPOSITION) NO. | RESULTS OF FRICTION EVALUATION TEST | |
|---|---|---|---|---|---|
| ITEMS | | | | REDUCTION RATE (%) OF FRICTION TORQUE | WEAR CONDITION |
| EXAMPLE | 1-1 | 0.1 | 1 | 30 (RELATIVE TO COM. EXAMPLE 1) | GOOD |
| | 1-2 | 0.1 | 2 | 20 (RELATIVE TO COM. EXAMPLE 1) | GOOD |
| | 1-3 | 0.1 | 3 | 25 (RELATIVE TO COM. EXAMPLE 1) | GOOD |
| | 1-4 | 0.1 | 4 | 15 (RELATIVE TO COM. EXAMPLE 1) | GOOD |
| | 1-5 | 0.1 | 5 | 15 (RELATIVE TO COM. EXAMPLE 1) | GOOD |
| | 1-6 | 0.1 | 6 | 15 (RELATIVE TO COM. EXAMPLE 1) | GOOD |
| | 1-7 | 0.1 | 7 | 40 (RELATIVE TO COM. EXAMPLE 1) | GOOD |
| | 1-8 | 0.1 | 1 | 35 (RELATIVE TO COM. EXAMPLE 1) | GOOD |
| | 1-9 | 0.1 | 3 | 15 (RELATIVE TO COM. EXAMPLE 2) | GOOD |
| | 1-10 | 0.1 | 4 | 25 (RELATIVE TO COM. EXAMPLE 2) | GOOD |
| | 1-11 | 0.1 | 5 | 20 (RELATIVE TO COM. EXAMPLE 2) | GOOD |

TABLE 2B-continued

| ITEMS | | SURFACE ROUGHNESS Ra OF CAM (µm) | LUBRICATING OIL (COMPOSITION) NO. | RESULTS OF FRICTION EVALUATION TEST | |
|---|---|---|---|---|---|
| | | | | REDUCTION RATE (%) OF FRICTION TORQUE | WEAR CONDITION |
| | 1-12 | 0.1 | 5 | 20 (RELATIVE TO COM. EXAMPLE 2) | GOOD |
| | 1-13 | 0.1 | 6 | 5 (RELATIVE TO COM. EXAMPLE 1) | FIXED PIN: COATING WORN |
| | 1-14 | 0.1 | 2 | 5 (RELATIVE TO COM. EXAMPLE 1) | FIXED PIN: COATING PEELED OFF |
| | 1-15 | 0.1 | 2 | 5 (RELATIVE TO COM. EXAMPLE 1) | FIXED PIN: COATING PEELED OFF |
| | 1-16 | 0.3 | 3 | 5 (RELATIVE TO COM. EXAMPLE 1) | OUTER ROLLER: COATING WORN |
| | 1-17 | 0.1 | 4 | 5 (RELATIVE TO COM. EXAMPLE 1) | FIXED PIN: COATING SCUFFED |
| COMPARATIVE | 1-1 | 0.1 | 8 | STANDARD | GOOD |
| EXAMPLE | 1-2 | 0.1 | 8 | STANDARD | GOOD |

MATERIAL OF CAM: LOW ALLOY CHILLED CAST IRON (HARDNESS Hv: 540)

Second Embodiment

A second embodiment of a rolling element (rolling bearing) according to the present invention will be discussed with reference to FIGS. 3 and 4.

Figure 3:
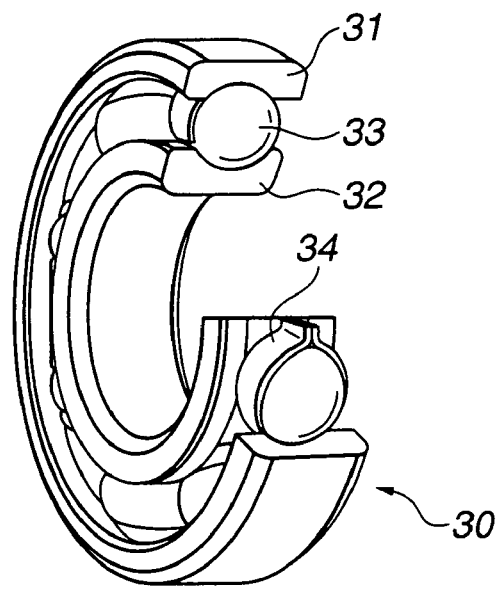
FIG. 3 is a perspective view, partly cut out, of a ball bearing as an example of a second embodiment of the rolling element according to the present invention.

As shown in FIG. 3, a ball bearing 30 includes inner and outer races or rings 31, 32 between which balls 13 are rotatably disposed with a retainer 34. Outer race 31 is formed at its inner peripheral surface with a ball race or groove (not identified) which peripherally extends. Inner face 32 is formed at its outer peripheral surface with a ball race or groove (not identified) which peripherally extends. Each ball 13 is slidably fitted at the ball races of outer and inner races 31, 32. Each of outer race 31, inner race 32, and balls 33 may be referred hereafter to as a "constituting member" for ball bearing 30.

Figure 4:
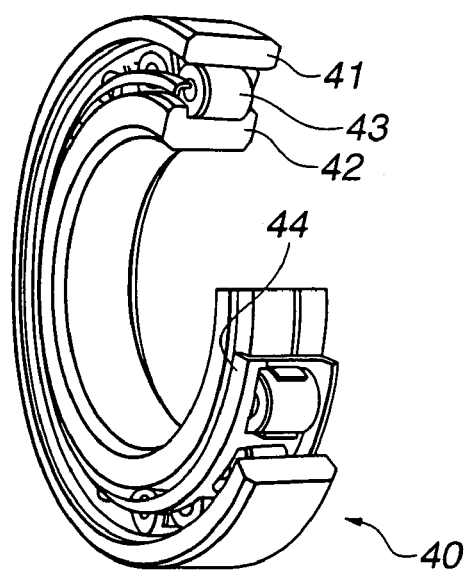
FIG. 4 is a perspective view, partly cut out, of a roller bearing as another example of a second embodiment of the rolling element according to the present invention.

Additionally, as shown in FIG. 4, a roller bearing 40 includes inner and outer races or rings 41, 42 between which rollers 43 are rotatably disposed with a retainer 44. Inner race 42 is formed at its outer peripheral surface with an roller race or groove (not identified) which peripherally extends. Each roller 43 is slidably fitted at the roller race of inner race 42. Each of outer race 41, inner race 42, and rollers 43 may be referred hereafter to as a "constituting member" for roller bearing 40.

The constituting members of the above ball and roller bearings are formed of an iron-based material (alloy) such as SUJ2 according to JIS. In ball bearing 30, the sliding surface of at least one of outer race 31, inner race 32 and balls 34 is coated with the DLC material to form the DLC coating. Similarly, in roller bearing 40, the sliding surface of at least one of outer race 41, inner race 42 and rollers 44 is coated with the DLC material to form the DLC coating. With such DLC coating, the constituting members of the ball and roller bearings can be slidably movable with a low friction. Preferably, the constituting members of the ball and roller bearings are in slidable contact with each other (opposite members) in presence of the lubricating oil (composition) containing the ashless fatty acid ester (ester of fatty acid) friction modifier and the ashless aliphatic amine friction modifier, or a lubricant whose main component is a compound containing hydroxyl group, so that the constituting members can make their sliding movement with extremely low friction. Additionally, it may be preferable that the sliding surface of the retainer 34, 44 of the ball and roller bearings is coated with the DLC material to form the DLC coating. Furthermore, while only the ball and roller bearings of radial bearings have been shown and described, it will be understood that the principle of the second embodiment may be applied to a variety of other radial bearings and a variety of thrust bearings.

Here, the DLC (diamond-like carbon) material is mainly constituted of carbon (element) and amorphous, taking a diamond structure ($SP^3$ bonding) or a graphite structure ($SP^2$ bonding) in bonding mode among carbons. More specifically, the hard carbon (DLC) thin film is formed of hydrogen-free amorphous carbon (a-C) that consists of carbon, hydrogen-containing amorphous carbon (a-C:H), or metal carbide or metal carbon (MeC) that contains as a part a metal element of titanium (Ti) or Molybdenum (Mo). For a significant reduction in friction, the DLC material is preferably as low as possible in hydrogen content and therefore has a hydrogen content of not more than 1 atomic %, and preferably formed of hydrogen-free amorphous carbon (a-C).

The surface of the base material of each of the constituting members to be coated with the DLC material preferably has a surface roughness (Ra) of not larger than 0.1 µm. Additionally, the surface roughness (Ra) of the member which is in slidable contact with the coated DLC material to serve as an opposite member and formed of the iron-based material (alloy) is preferably not larger than 0.1 µm. These are suitable from the viewpoint of obtaining stability in sliding movement. If the surface roughness exceeds 0.1 µm, the member makes its local scuffing and is largely increased in friction coefficient. The surface roughness (Ra) is explained as $R_{a75}$ in JIS (Japanese Industrial Standard) B 0601 (:2001).

The coating of the DLC material (DLC coating) formed on each constituting member preferably has a surface hardness or micro Vickers hardness (Hv) ranging from 1000 to 3500 as measured under application of a 10 g load and a thickness ranging from 0.3 to 2.0 µm. Additionally, the sliding surface (in slidable contact with the DLC coating) of the opposite member formed of the iron-based material preferably has a surface roughness or micro Vickers hardness (Hv) of not smaller than 700 as measured under application of a 10 g load. If the surface hardness and thickness of the DLC coating are out of the above ranges, wear of the DLC coating will occur in case that the surface hardness (Hv) is smaller than 1000 and the thickness is smaller than 0.3 µm, whereas peeling-off tends to occur in case that the surface hardness (Hv) exceeds 3500 and the thickness exceeds 2.0 μm. Additionally, if the surface hardness (Hv) of the iron-based material member as the opposite member is smaller than 700, buckling of the DLC coating tends to occur at a high Hertz's contact pressure.

As discussed above, the constituting members of the ball and roller bearings are in slidable contact with each other (opposite members) in presence of the lubricating oil (composition) containing the ashless fatty acid ester (ester of fatty acid) friction modifier and the ashless aliphatic amine friction modifier, or the lubricant whose main component is a compound containing hydroxyl group. The lubricating oil (composition) is the same as that in the first embodiment. Preferable examples of the lubricant whose main component is a compound containing hydroxyl group are alcohols, particularly glycerol and ethylene glycol.

EXPERIMENT 2

The present invention will be more readily understood with reference to the following Examples in comparison with Comparative Examples; however, these Examples are intended to illustrate the invention and are not to be construed to limit the scope of the invention.

[Production of Rolling Bearings]

Each of an outer race, an inner face and balls or rollers as the constituting members of a ball bearing or a roller bearing was formed of a material SUJ2 and prepared as follows: The material SUJ2 was formed into a shape similar to the final product of each constituting member. The thus formed material SUJ2 was heat-treated to be hardened, followed by being subjected to a barrel lapping to have a surface roughness (Ra) of not larger than 0.1 μm. In case that the constituting member was coated with a (surface) coating, the lapped material SUJ2 was coated with each of a variety of coating materials as shown in Table 4 by a PVD process or a CVD process to form the (surface) coating having a certain thickness. In Table 4, the hydrogen content of the coating material is represented as "atomic %".

The thus produced constituting members were assembled to form a ball bearing as shown in FIG. 3 or a roller bearing as shown in FIG. 4, corresponding to Examples and Comparative Examples. Examples 2-1 to 2-8B and Comparative Examples 2-1 and 2-3 were directed to the ball bearing, whereas Examples 2-9 to 2-12B and Comparative. Examples 2-2 and 2-4 were directed to the roller bearing.

[Preparation of Lubricating Oil and Lubricant]

A mineral oil or PAO (poly alpha-olefin) was used as a base oil. A variety of additives such as a variety of friction modifiers and others were blended to the base oil thereby preparing eight kinds of lubricating oils shown as "Lubricating oil (composition) A to H" in Table 3. In Table 3, the mineral oil and the synthetic oil are represented as mass % relative to the total amount of the base oil, whereas the additives are represented as mass % relative to the total amount of the lubricating oil (composition). Additionally, glycerol and ethylene glycol were used as the lubricant (alcohol).

[Friction Evaluation Test]

A friction evaluation test was conduced on each rolling bearing (the ball or roller bearing) by using a rolling bearing single member test apparatus which could measure a friction torque of the rolling bearing, in which the inner race was driven to rotate. The friction evaluation test was conducted in presence of the engine oil or the lubricant under the following conditions:

(a) Engine oil (lubricating oil) or lubricant supply manner: The rolling bearing being dipped in an oil bath containing the oil or the lubricant;
(b) Temperature of the oil or lubricant: 80° C.;
(c) Maximum Hertz's contact pressure to be applied to the rolling bearing: 1 GPa;
(d) Rotational speed of the inner race: 500 r.p.m.; and
(e) Test time: 60 min.

Results of the friction evaluation test are tabulated as "reduction rate (%) of friction torque" and "wear conditions" in Table 4. The "reduction rate (%) of friction torque" in Examples 2-1 to 2-8B is a rate of reduction of friction torque relative to the friction torque in Comparative Example 2-1 (represented as "Standard") relating to the ball bearing. The "reduction rate (%) of friction torque" in Examples 2-9 to 2-12B is a rate of reduction of friction torque relative to the friction torque in Comparative Example 2-2 (represented as "Standard") relating to the roller bearing.

[Test Result]

As apparent from Table 4, excellent low friction torque characteristics can be exhibited in Examples 2-1 to 2-8 directed to the combinations of the ball bearings as the rolling bearings of this embodiment and the lubricating oils (oil compositions). It is confirmed that these combinations can provide a friction reduction effect of 15 to 40% or more relative to the combination of the general ball bearing and the standard engine oil (lubricating oil). Additionally, it is also confirmed that no problem occurs in surface condition of the ball bearings of Examples, and that the ball bearings of Examples are highly excellent in wear resistance. The test results of Examples 2-1, 2-3 and 2-5 reveal that the friction reduction effect becomes higher as the content of zinc dithiophosphate decreases. The test results of Examples 2-7 and 2-8 reveal that the friction reduction effect can be improved by adding the coating of a-C (amorphous carbon) to the outer race and the inner race.

Further, in Examples 2-9 to 2-12 in which the roller bearings as the rolling bearings of this embodiment are in combination with the lubricating oil (composition), apparent friction reduction effects can be found as compared with Comparative Example 2-2 relating to the combination of the general roller bearing and the standard engine oil (lubricating oil). Additionally, it is confirmed that a further friction reduction effect can be obtained by adding the DLC coating of a-C to the surface of the outer race and the inner race.

Furthermore, it is found that a still further friction reduction effect can be obtained in Examples 2-8A and 2-8B relating to the ball bearings using glycerol and ethylene glycol as the lubricant and in Examples 2-12A and 2-12B relating to the roller bearings using glycerol and ethylene glycol as the lubricant.

In Comparative Example 2-3 in which the ball bearing coated with the DLC material (a-C) containing 20 atomic % of hydrogen is in combination with the lubricating oil (composition) F, it is confirmed that a friction lowering effect can be apparently inferior as compared with Example 2-6 in which the DLC material containing only 1 atomic % of hydrogen. Additionally, in Comparative Example 2-4 in which the rolling bearing coated with the DLC material (a-C) containing 10 atomic % of hydrogen is in combination with the lubricating oil (composition) B, it is found that a friction lowering effect is apparently inferior as compared with Example 2-9 in which the rollers are coated with the DLC material containing no hydrogen.

It is revealed that the film of the DLC coating (a-C) tends to wear if the thickness of the DLC coating is decreased to 0.2 μm below the suitable range, the film of the coating tends to wear, whereas a high internal stress is developed so that the coating film tends to peel off if the thickness exceeds 2 μm. Furthermore, it is also revealed that sliding scratches due to scuffing wear are formed at the sliding surface while the friction lowering effect is sharply lowered if the surface roughness (Ra) of the sliding or rolling surface reaches a value of 0.1 μm or more.

As appreciated from the above, according to this embodiment, the sliding surface of at least one of the outer race, inner race and balls in case of the ball bearing or the sliding surface of at least one of the outer race, inner race and rollers in case of the roller bearing is coated with the DLC material, preferably the DLC material (a-C:H) less in hydrogen content, more preferably the DLC material (a-C) containing no hydrogen.

Accordingly, the ball and roller bearings of this embodiment exhibit excellent low friction characteristics, realizing sharp reductions in friction loss. Additionally, under sliding movement of each constituting member of the ball and roller bearings in presence of the lubricating oil (composition) containing the specified ashless friction modifier or the lubricant whose main component is a compound containing hydroxyl group, highly excellent low friction characteristics can be exhibited while realizing sharp reductions in friction loss. This can provide a rolling bearing which is highly effective for improving a fuel economy in an internal combustion engine and a transmission efficiency in a power transmission mechanism in an automotive vehicle, and a lubricating oil (composition) to be used in the engine.

TABLE 3

| KIND OF LUBRICATING OIL (COMPOSITION) | | A | B | C | D | E | F | G | H |
|---|---|---|---|---|---|---|---|---|---|
| HYDROGENOLYSIS BASE OIL[1] | | 100 | 100 | — | 100 | 100 | 100 | 100 | 100 |
| PAO[2] | | — | — | 100 | — | — | — | — | — |
| GLYCEROL[3] | MASS % | 1.00 | 1.00 | 1.00 | — | 1.00 | 1.00 | 0.20 | 1.00 |
| MODIFIED OLEYLAMINE[4] | MASS % | — | — | — | 1.00 | — | 0.50 | — | — |
| ASHLESS DISPERSANT[5] | MASS % | 5.00 | 5.00 | 5.00 | 5.00 | 5.00 | 5.00 | 5.00 | 5.00 |
| OTHER ADDITIVES[6] | MASS % | 6.0 | 6.5 | 6.5 | 6.5 | 7.0 | 7.0 | 6.5 | 7.5 |
| [OIL PROPERTIES] | | | | | | | | | |
| KINEMATIC VISCOSITY AT 100° C. | mm$^2$/s | 10.3 | 10.2 | 10.0 | 10.2 | 10.3 | 10.3 | 10.3 | 10.3 |
| TOTAL BASE NUMBER ACCORDING TO PERCHLORIC ACID METHOD | mg KOH/g | 6.2 | 6.2 | 6.2 | 6.2 | 6.5 | 6.5 | 6.5 | 6.5 |
| TOTAL BASE NUMBER ACCORDING TO HYDROCHLORIC ACID METHOD | mg KOH/g | 4.5 | 4.5 | 4.5 | 4.2 | 5.2 | 5.2 | 5.2 | 5.2 |
| P CONTENT DERIVED FROM ZINC DIALKYlDITHIOPHOSPHATE | MASS % | 0.00 | 0.05 | 0.05 | 0.05 | 0.09 | 0.09 | 0.05 | 0.14 |

[NOTE]
[1] KINEMATIC VISCOSITY AT 100° C.: 5.0 mm$^2$/s, VISCOSITY INDEX: 120, AROMATIC CONTENT: 5.5 MASS %
[2] KINEMATIC VISCOSITY AT 100° C.: 3.9 mm$^2$/s, VISCOSITY INDEX: 124, AROMATIC CONTENT: 0.0 MASS %
[3] GLYCEROL MONOLATE (PURITY: NOT LOWER THAN 93 MASS %)
[4] MODIFIED OLEYLAMINE (PURITY: NOT LOWER THAN 90 MASS %)
[5] ASHLESS DISPERSANT (POLYBUTENYL SUCCINIMIDE (NITROGEN CONTENT: 1.2 MASS %)
[6] OTHER ADDITIVES WHICH BE ABLE TO BE ADDED, INCLUDING ANTIOXIDANT, EXTREME-PRESSURE AGENT, RUST INHIBITOR, DEMULSIFIER, NONIONIC SURFACTANT, METAL DEACTIVATOR AND ANTI-FOAMING AGENT

TABLE 4

| ITEMS | COATING MATERIAL OF BALLS | THICKNESS OF COATING μm | COATING MATERIAL OF INNER AND OUTER RACES | THICKNESS OF COATING μm | COATING MATERIAL OF ROLLERS | THICKNESS OF COATING μm | SURFACE HARDNESS (Hv) OF COATING OF BALLS | SURFACE HARDNESS (Hv) OF COATING OF INNER AND OUTER RACES |
|---|---|---|---|---|---|---|---|---|
| EXAMPLE 2-1 | a-C | 1.3 | none | — | — | — | 2250 | 750 |
| EXAMPLE 2-2 | a-C | 1.9 | none | — | — | — | 1650 | 750 |
| EXAMPLE 2-3 | a-C | 0.8 | none | — | — | — | 2750 | 750 |
| EXAMPLE 2-4 | a-C | 0.9 | none | — | — | — | 3500 | 750 |
| EXAMPLE 2-5 | a-C | 0.3 | none | — | — | — | 1800 | 750 |
| EXAMPLE 2-6 | DLC (a-C:H) 1% H | 2.0 | none | — | — | — | 1600 | 750 |
| EXAMPLE 2-7 | a-C | 0.9 | a-C | 0.9 | — | — | 3500 | 2700 |
| EXAMPLE 2-8 | a-C | 0.9 | a-C | 1.5 | — | — | 3500 | 2200 |
| EXAMPLE 2-8A | a-C | 0.9 | a-C | 1.5 | — | — | 3500 | 2200 |
| EXAMPLE 2-8B | a-C | 0.9 | a-C | 1.5 | — | — | 3500 | 2200 |
| EXAMPLE 2-9 | — | — | none | — | a-C | 0.8 | — | 750 |

TABLE 4-continued

| ITEMS | | | | | | | | |
|---|---|---|---|---|---|---|---|---|
| EXAMPLE 2-10 | — | — | none | — | a-C | 0.3 | — | 750 |
| EXAMPLE 2-11 | — | — | a-C | 0.9 | a-C | 0.8 | — | 2700 |
| EXAMPLE 2-12 | — | — | a-C | 0.9 | a-C | 1.5 | — | 2700 |
| EXAMPLE 2-12A | — | — | a-C | 0.9 | a-C | 1.5 | — | 2700 |
| EXAMPLE 2-12B | — | — | a-C | 0.9 | a-C | 1.5 | — | 2700 |
| COMPARATIVE EXAMPLE 2-1 | NONE | — | none | — | — | — | 750 | 750 |
| COMPARATIVE EXAMPLE 2-2 | — | — | none | — | none | — | — | 750 |
| COMPARATIVE EXAMPLE 2-3 | DLC (a-C:H) 20% H | 1.5 | none | — | — | — | 1400 | 750 |
| COMPARATIVE EXAMPLE 2-4 | — | — | none | — | DLC (a-C:H) 10% H | 0.2 | — | 750 |

| ITEMS | SURFACE HARDNESS (Hv) OF COATING OF ROLLERS | SURFACE ROUGHNESS Ra (μm) OF COATING OF BALLS | SURFACE ROUGHNESS Ra (μm) OF COATING OF INNER AND OUTER RACES | SURFACE ROUGHNESS Ra (μm) OF COATING OF ROLLERS | LUBRICATING OIL OR LUBRICANT | REDUCTION RATE (%) OF FRICTION TORQUE | WEAR CONDITION |
|---|---|---|---|---|---|---|---|
| EXAMPLE 2-1 | — | 0.02 | 0.02 | — | A | 30% | GOOD |
| EXAMPLE 2-2 | — | 0.02 | 0.02 | — | B | 20% | GOOD |
| EXAMPLE 2-3 | — | 0.02 | 0.02 | — | C | 25% | GOOD |
| EXAMPLE 2-4 | — | 0.02 | 0.02 | — | D | 15% | GOOD |
| EXAMPLE 2-5 | — | 0.02 | 0.02 | — | E | 15% | GOOD |
| EXAMPLE 2-6 | — | 0.03 | 0.02 | — | F | 25% | GOOD |
| EXAMPLE 2-7 | — | 0.02 | 0.02 | — | G | 15% | GOOD |
| EXAMPLE 2-8 | — | 0.02 | 0.02 | — | A | 35% | GOOD |
| EXAMPLE 2-8A | — | 0.02 | 0.02 | — | GLYCEROL | 50% | GOOD |
| EXAMPLE 2-8B | — | 0.02 | 0.02 | — | ETHYLENE GLYCOL | 40% | GOOD |
| EXAMPLE 2-9 | 2700 | — | 0.02 | 0.02 | C | 25% | GOOD |
| EXAMPLE 2-10 | 1750 | — | 0.02 | 0.02 | D | 20% | GOOD |
| EXAMPLE 2-11 | 2700 | — | 0.02 | 0.02 | C | 35% | GOOD |
| EXAMPLE 2-12 | 1800 | — | 0.02 | 0.02 | E | 30% | GOOD |
| EXAMPLE 2-12A | 1800 | — | 0.02 | 0.02 | GLYCEROL | 45% | GOOD |
| EXAMPLE 2-12B | 1800 | — | 0.02 | 0.02 | ETHYLENE GLYCOL | 35% | GOOD |
| COMPARATIVE EXAMPLE 2-1 | — | 0.02 | 0.02 | — | H | STANDARD | GOOD |
| COMPARATIVE EXAMPLE 2-2 | 750 | — | 0.02 | — | H | STANDARD | GOOD |
| COMPARATIVE EXAMPLE 2-3 | — | 003 | 0.02 | — | F | NOT LARGER THAN 5% | GOOD |
| COMPARATIVE EXAMPLE 2-4 | — | — | 0.02 | 0.02 | B | NOT LARGER THAN 5% | COATING OF ROLLERS WORN |

The entire contents of Japanese Patent Application P2003-148524 (filed May 27, 2003) and P2003-207430 (filed Aug. 13, 2003) are incorporated herein by reference.

Nissan Motor Co., Ltd. and Nippon Oil Corporation are parties to a joint research agreement.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A rolling element comprising:
    a first member;
    a second member coaxially disposed to the first annular member and rotatably movable relative to the first member; and
    a diamond-like carbon material coated on a sliding surface of at least one of the first and second members,
    wherein the first and second members are in slidable contact with each other in the presence of a lubricating oil composition containing at least one of ashless fatty acid ester friction modifier and ashless aliphatic amine friction modifier.

2. A rolling bearing comprising:
    an outer race;
    an inner race coaxially disposed inside the outer race and rotatably movable relative to the outer race;
    rolling members rotatably disposed between the outer race and the inner race; and
    a diamond-like carbon material coated on a sliding surface of at least one of the outer race, the inner race and the rolling members,
    wherein the outer race, the inner race and the rolling members are in slidable contact with each other in presence of a lubricating oil composition containing at least one of ashless fatty acid ester friction modifier and ashless aliphatic amine friction modifier.

3. A rolling bearing as claimed in claim 2, wherein the rolling members are balls.

4. A rolling bearing as claimed in claim 2, wherein the rolling members are rollers.

5. A rolling bearing as claimed in claim 2, wherein the diamond-like carbon material contains hydrogen in an amount of not more than 1 atomic %.

6. A rolling bearing as claimed in claim 2, wherein the diamond-like carbon material is an amorphous carbon material which substantially contains no hydrogen.

7. A rolling bearing as claimed in claim 2, wherein the outer race, the inner race and the rolling members are formed of an iron-based material.

8. A rolling bearing as claimed in claim 7, wherein the coated diamond-like carbon material has a surface roughness (Ra) of not larger than 0.1 μm, and the sliding surface in slidable contact with the diamond-like coating material, of at least one of the outer race, the inner race and the rolling members coated with no diamond-like carbon material has a surface roughness (Ra) of not larger than 0.1 μm.

9. A rolling bearing as claimed in claim 2, wherein the coated diamond-like carbon material has a surface hardness (Hv) ranging from 1000 to 3500 in micro Vickers hardness Hv as measured under application of a 10 g load, and a thickness ranging from 0.3 to 2.0 μm.

10. A rolling bearing as claimed in claim 2, wherein the at least one of ashless fatty acid ester friction modifier and ashless aliphatic amine friction modifier has a hydrocarbon chain having a carbon number ranging from 6 to 30 and contained in an amount of 0.05 to 3.0% by mass based on a total mass of the lubricating oil.

11. A rolling bearing as claimed in claim 2, wherein the lubricating oil contains at least one of polybutenyl succinimide and a derivative of polybutenyl succinimide, in an amount ranging from 0.1 to 15% by mass based on a total mass of the lubricating oil.

12. A rolling bearing as claimed in claim 2, wherein the lubricating oil contains zinc dithiophosphate in an amount of not larger than 0.1% by mass in terms of an phosphorus element based on a total mass of the lubricating oil composition.

13. A rolling bearing as claimed in claim 2, wherein the outer race, the inner race and the rolling members are in slidable contact with each other in presence of a lubricant whose main component is a compound containing hydroxyl group.

14. A rolling bearing as claimed in claim 13, wherein the lubricant is at least one of alcohols.

15. A rolling bearing as claimed in claim 14, wherein the at least of alcohols is at least one of glycerol and ethylene glycol.

* * * * *